US012753255B2

(12) United States Patent
Isaka et al.

(10) Patent No.: US 12,753,255 B2
(45) **Date of Patent: *Oct. 6, 2026**

(54) FLUORINE-CONTAINING COPOLYMER

(71) Applicant: DAIKIN INDUSTRIES, LTD., Osaka (JP)

(72) Inventors: Tadaharu Isaka, Osaka (JP); Yumi Zenke, Osaka (JP); Yukari Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,522

(22) Filed: Sep. 25, 2024

(65) Prior Publication Data

US 2025/0019477 A1 Jan. 16, 2025

Related U.S. Application Data

(63) Continuation of application No. PCT/JP2023/013343, filed on Mar. 30, 2023.

(30) Foreign Application Priority Data

Mar. 30, 2022 (JP) ................................. 2022-055229
Aug. 26, 2022 (JP) ................................. 2022-135145

(51) Int. Cl.
*C08F 214/26* (2006.01)
*C09D 127/18* (2006.01)
*H01B 3/44* (2006.01)

(52) U.S. Cl.
CPC ........ *C08F 214/262* (2013.01); *C09D 127/18* (2013.01); *H01B 3/445* (2013.01); *C08F 2800/20* (2013.01)

(58) Field of Classification Search
CPC ................ C08F 214/262; C08F 214/28; C08F 216/1408
See application file for complete search history.

(56) References Cited

U.S. PATENT DOCUMENTS 3,085,083 A 4/1963 Schreyer
4,029,868 A 6/1977 Carlson
4,105,716 A 8/1978 Sakai et al.
4,262,101 A 4/1981 Hartwimmer et al.
4,546,157 A 10/1985 Nakagawa et al.
4,552,925 A 11/1985 Nakagawa et al.
4,587,316 A 5/1986 Nakagawa et al.
H130 H 9/1986 McDermott et al.
4,703,095 A 10/1987 Nakagawa et al.
4,902,444 A 2/1990 Kolouch
5,000,875 A 3/1991 Kolouch
5,571,462 A 11/1996 Hashimoto et al.
5,677,404 A 10/1997 Blair
5,703,185 A 12/1997 Blair
5,817,419 A 10/1998 Fryd et al.
5,888,424 A 3/1999 Ebnesajjad et al.
6,689,833 B1 2/2004 Bidstrup et al.
6,734,236 B1 5/2004 Tomihashi et al.
7,592,406 B2 9/2009 Kenny et al.
11,926,753 B2 3/2024 Imamura et al.
2003/0013791 A1 1/2003 Blong et al.
2003/0026995 A1 2/2003 Duchesne et al.
2003/0102593 A1 6/2003 Kaulbach et al.
2003/0153701 A1 8/2003 Kono et al.
2003/0220458 A1 11/2003 Taira et al.
2004/0072935 A1 4/2004 Blong et al.
2004/0204536 A1 10/2004 Miyatani et al.
2004/0242819 A1 12/2004 Earnest, Jr. et al.
2004/0254300 A1 12/2004 Namimatsu et al.
2004/0260044 A1 12/2004 Earnest, Jr. et al.
2005/0020792 A1 1/2005 Aoyama et al.
2005/0080211 A1 4/2005 Earnest, Jr. et al.
2005/0118431 A1 6/2005 Kono et al.
2005/0187328 A1 8/2005 Globus et al.
2005/0245707 A1 11/2005 Arase et al.
2006/0276604 A1 12/2006 Earnest, Jr. et al.
2007/0092714 A1 4/2007 Namimatsu et al.
2007/0092715 A1 4/2007 Namimatsu et al.
2007/0149734 A1 6/2007 Sakakibara et al.
2007/0243388 A1 10/2007 Kono et al.
2007/0292685 A1 12/2007 Brothers et al.
2008/0038627 A1 2/2008 Yamauchi et al.
2008/0090065 A1 4/2008 Kenny et al.
2008/0166091 A1 7/2008 Aoyagi et al.
2008/0200627 A1 8/2008 Funaki et al.
2008/0241534 A1 10/2008 Ohtani et al.
2008/0293904 A1 11/2008 Earnest, Jr. et al.
2009/0044965 A1 2/2009 Kono et al.
2009/0152776 A1 6/2009 Aten et al.
2009/0200711 A1 8/2009 Aten et al.
(Continued)

FOREIGN PATENT DOCUMENTS

CA 1 248 292 A 1/1989
CN 1382163 A 11/2002
(Continued)

OTHER PUBLICATIONS

Lan Jun et al., "Study on Perfluoroalkyl Vinyl Ether Modified Poly(FEP) Resin", Chemical Production and Technology, Issue 1, Feb. 25, 2015, pp. 1-3 (4 pages total).
(Continued)

*Primary Examiner* — James C Yager
(74) *Attorney, Agent, or Firm* — Sughrue Mion, PLLC

(57) ABSTRACT

There is provided a fluorine-containing copolymer comprising tetrafluoroethylene unit, hexafluoropropylene unit and perfluoro(propyl vinyl ether) unit, wherein the copolymer has a content of hexafluoropropylene unit of 9.5 to 11.4% by mass with respect to the whole of the monomer units, a content of perfluoro(propyl vinyl ether) unit of 0.8 to 1.7% by mass with respect to the whole of the monomer units, a melt flow rate at 372° C. of 9.0 to 14.0 g/10 min, and a total number of a carbonyl group-containing terminal group, $—CF{=}CF_2$ and $—CH_2OH$ per $10^6$ main-chain carbon atoms of 100 or less.

7 Claims, No Drawings

(56) References Cited

U.S. PATENT DOCUMENTS

| | | | |
|---|---|---|---|
| 2009/0219243 | A1 | 9/2009 | Chen |
| 2009/0233052 | A1 | 9/2009 | Thuot et al. |
| 2010/0009075 | A1 | 1/2010 | Chandler et al. |
| 2010/0212929 | A1 | 8/2010 | Ishii et al. |
| 2010/0314153 | A1 | 12/2010 | Ishii et al. |
| 2010/0314154 | A1 | 12/2010 | Kitahara et al. |
| 2011/0287202 | A1 | 11/2011 | Ichisaka et al. |
| 2012/0058256 | A1 | 3/2012 | Earnest, Jr. et al. |
| 2012/0231196 | A1 | 9/2012 | Ichisaka et al. |
| 2013/0230645 | A1 | 9/2013 | Kitahara et al. |
| 2014/0255703 | A1 | 9/2014 | Aten et al. |
| 2015/0047874 | A1 | 2/2015 | Thuot et al. |
| 2015/0141581 | A1 | 5/2015 | Brothers et al. |
| 2015/0175757 | A1 | 6/2015 | Aten et al. |
| 2016/0005506 | A1 | 1/2016 | Isaka et al. |
| 2016/0319089 | A1 | 11/2016 | Imamura et al. |
| 2016/0322128 | A1 | 11/2016 | Imamura et al. |
| 2017/0008986 | A1 | 1/2017 | Isaka et al. |
| 2017/0025204 | A1 | 1/2017 | Chapman et al. |
| 2017/0204233 | A1 | 7/2017 | Nakanishi et al. |
| 2017/0260344 | A1 | 9/2017 | Imamura et al. |
| 2018/0016375 | A1 | 1/2018 | Duchesne et al. |
| 2018/0030183 | A1 | 2/2018 | Duchesne et al. |
| 2018/0057625 | A1 | 3/2018 | Hintzer et al. |
| 2018/0265654 | A1 | 9/2018 | Imamura et al. |
| 2019/0085142 | A1 | 3/2019 | Kasai et al. |
| 2019/0177453 | A1 | 6/2019 | Isaka et al. |
| 2019/0382544 | A1 | 12/2019 | Yokotani et al. |
| 2020/0123377 | A1 | 4/2020 | Nakanishi et al. |
| 2020/0332037 | A1 | 10/2020 | Isaka et al. |
| 2021/0024769 | A1 | 1/2021 | Imamura et al. |
| 2021/0032201 | A1 | 2/2021 | Isaka |
| 2021/0115224 | A1 | 4/2021 | Kato et al. |
| 2021/0206970 | A1 | 7/2021 | Saigusa et al. |
| 2021/0246237 | A1 | 8/2021 | Isaka et al. |
| 2022/0169830 | A1 | 6/2022 | Kato et al. |
| 2022/0181689 | A1 | 6/2022 | Isaka et al. |
| 2022/0181698 | A1 | 6/2022 | Isaka et al. |
| 2022/0181729 | A1 | 6/2022 | Isaka et al. |
| 2022/0195087 | A1 | 6/2022 | Fukagawa et al. |
| 2022/0195088 | A1 | 6/2022 | Imamura et al. |
| 2022/0195169 | A1 | 6/2022 | Kuwajima et al. |
| 2022/0278403 | A1 | 9/2022 | Isaka et al. |
| 2023/0382026 | A1 | 11/2023 | Isaka et al. |
| 2023/0390978 | A1 | 12/2023 | Tsuda et al. |
| 2023/0391913 | A1 | 12/2023 | Isaka et al. |
| 2023/0391914 | A1 | 12/2023 | Isaka et al. |
| 2023/0391915 | A1 | 12/2023 | Isaka et al. |
| 2023/0391916 | A1 | 12/2023 | Isaka et al. |
| 2023/0391918 | A1 | 12/2023 | Isaka et al. |
| 2023/0391919 | A1 | 12/2023 | Isaka et al. |
| 2023/0391921 | A1 | 12/2023 | Isaka et al. |
| 2023/0391922 | A1 | 12/2023 | Isaka et al. |
| 2023/0391923 | A1 | 12/2023 | Isaka et al. |
| 2023/0391924 | A1 | 12/2023 | Yamamoto et al. |
| 2023/0391925 | A1 | 12/2023 | Isaka et al. |
| 2023/0391926 | A1 | 12/2023 | Isaka et al. |
| 2023/0391928 | A1 | 12/2023 | Isaka et al. |
| 2023/0391930 | A1 | 12/2023 | Isaka et al. |
| 2023/0399427 | A1 | 12/2023 | Isaka et al. |
| 2023/0399428 | A1 | 12/2023 | Isaka et al. |
| 2023/0399429 | A1 | 12/2023 | Isaka et al. |
| 2023/0399430 | A1 | 12/2023 | Isaka et al. |
| 2023/0399431 | A1 | 12/2023 | Isaka et al. |
| 2023/0399433 | A1 | 12/2023 | Isaka et al. |
| 2023/0399434 | A1 | 12/2023 | Isaka et al. |
| 2023/0399435 | A1 | 12/2023 | Isaka et al. |
| 2023/0399436 | A1 | 12/2023 | Isaka et al. |
| 2023/0399437 | A1 | 12/2023 | Isaka et al. |
| 2023/0399439 | A1 | 12/2023 | Isaka et al. |
| 2023/0399440 | A1 | 12/2023 | Isaka et al. |
| 2023/0399442 | A1 | 12/2023 | Isaka et al. |
| 2023/0406977 | A1 | 12/2023 | Isaka et al. |
| 2023/0416431 | A1 | 12/2023 | Isaka et al. |
| 2024/0018285 | A1 | 1/2024 | Isaka et al. |
| 2025/0002623 | A1 | 1/2025 | Isaka et al. |
| 2025/0002624 | A1 | 1/2025 | Isaka et al. |
| 2025/0011486 | A1 | 1/2025 | Isaka et al. |
| 2025/0011487 | A1 | 1/2025 | Isaka et al. |
| 2025/0011489 | A1 | 1/2025 | Isaka et al. |
| 2025/0011491 | A1 | 1/2025 | Isaka et al. |
| 2025/0011492 | A1 | 1/2025 | Isaka et al. |
| 2025/0011493 | A1 | 1/2025 | Isaka et al. |
| 2025/0011494 | A1 | 1/2025 | Isaka et al. |
| 2025/0011495 | A1 | 1/2025 | Isaka et al. |
| 2025/0011497 | A1 | 1/2025 | Isaka et al. |
| 2025/0011501 | A1 | 1/2025 | Isaka et al. |
| 2025/0011502 | A1 | 1/2025 | Isaka et al. |
| 2025/0011503 | A1 | 1/2025 | Isaka et al. |
| 2025/0011504 | A1 | 1/2025 | Isaka et al. |
| 2025/0011505 | A1 | 1/2025 | Isaka et al. |
| 2025/0011506 | A1 | 1/2025 | Isaka et al. |
| 2025/0034301 | A1 | 1/2025 | Isaka et al. |
| 2025/0145746 | A1 | 5/2025 | Isaka et al. |
| 2025/0145816 | A1 | 5/2025 | Isaka et al. |
| 2025/0282902 | A1 | 9/2025 | Yamamoto et al. |

FOREIGN PATENT DOCUMENTS

| | | | |
|---|---|---|---|
| CN | 1390236 | A | 1/2003 |
| CN | 1527852 | A | 9/2004 |
| CN | 1958646 | A | 5/2007 |
| CN | 101472965 | A | 7/2009 |
| CN | 101945927 | A | 1/2011 |
| CN | 105900186 | A | 8/2016 |
| CN | 105980426 | A | 9/2016 |
| CN | 106536631 | A | 3/2017 |
| CN | 107406550 | A | 11/2017 |
| CN | 110790854 | A | 2/2020 |
| CN | 111699173 | A | 9/2020 |
| EP | 1 063 245 | A1 | 12/2000 |
| EP | 1 260 526 | A1 | 11/2002 |
| EP | 1 262 496 | A1 | 12/2002 |
| EP | 1 170 303 | B1 | 7/2007 |
| EP | 3091042 | A1 | 11/2016 |
| JP | 52-73994 | A | 6/1977 |
| JP | 52-109588 | A | 9/1977 |
| JP | 58-69213 | A | 4/1983 |
| JP | 59-2821 | B2 | 1/1984 |
| JP | 60-23689 | B2 | 6/1985 |
| JP | 60-240713 | A | 11/1985 |
| JP | 62-24444 | B2 | 5/1987 |
| JP | 62-192411 | A | 8/1987 |
| JP | 63-1963 | B2 | 1/1988 |
| JP | 2-129253 | A | 5/1990 |
| JP | 03-122907 | A | 5/1991 |
| JP | 05-151846 | A | 6/1993 |
| JP | 6-40813 | B2 | 6/1994 |
| JP | 9-52920 | A | 2/1997 |
| JP | 10-292054 | A | 11/1998 |
| JP | 11-512217 | A | 10/1999 |
| JP | 11-513052 | A | 11/1999 |
| JP | 2000-281939 | A | 10/2000 |
| JP | 2001-501551 | A | 2/2001 |
| JP | 2002-265522 | A | 9/2002 |
| JP | 2002-293831 | A | 10/2002 |
| JP | 2004-502853 | A | 1/2004 |
| JP | 2005-320497 | A | 11/2005 |
| JP | 2006-528274 | A | 12/2006 |
| JP | 2007-15364 | A | 1/2007 |
| JP | 2008-66254 | A | 3/2008 |
| JP | 2009-540105 | A | 11/2009 |
| JP | 2010-53209 | A | 3/2010 |
| JP | 2010-507272 | A | 3/2010 |
| JP | 2010-95575 | A | 4/2010 |
| JP | 2010-179611 | A | 8/2010 |
| JP | 2010-180366 | A | 8/2010 |
| JP | 2010-229163 | A | 10/2010 |
| JP | 2011-506140 | A | 3/2011 |
| JP | 2011-508681 | A | 3/2011 |
| JP | 2011-514407 | A | 5/2011 |
| JP | 2011-514650 | A | 5/2011 |
| JP | 4882194 | B2 | 2/2012 |
| JP | 4968338 | B2 | 7/2012 |

(56) References Cited

FOREIGN PATENT DOCUMENTS

| | | | |
|---|---|---|---|
| JP | 2013-100532 | A | 5/2013 |
| JP | 5273048 | B2 | 8/2013 |
| JP | 2013-191527 | A | 9/2013 |
| JP | 2014-28952 | A | 2/2014 |
| JP | 2014-28953 | A | 2/2014 |
| JP | 2014-224228 | A | 12/2014 |
| JP | 2015-54431 | A | 3/2015 |
| JP | 2015-516029 | A | 6/2015 |
| JP | 2015-147924 | A | 8/2015 |
| JP | 2016-516608 | A | 6/2016 |
| JP | 2016-135862 | A | 7/2016 |
| JP | 2017-503052 | A | 1/2017 |
| JP | 6134818 | B2 | 5/2017 |
| JP | 2017-197690 | A | 11/2017 |
| JP | 2018-523272 | A | 8/2018 |
| JP | 2019-194314 | A | 11/2019 |
| JP | 2020-100823 | A | 7/2020 |
| JP | 2021-141045 | A | 9/2021 |
| JP | 2022-132204 | A | 9/2022 |
| JP | 2022-132205 | A | 9/2022 |
| JP | 2022-132206 | A | 9/2022 |
| JP | 2022-132207 | A | 9/2022 |
| JP | 2022-132208 | A | 9/2022 |
| JP | 2022-132209 | A | 9/2022 |
| JP | 2022-132212 | A | 9/2022 |
| JP | 2022-132213 | A | 9/2022 |
| JP | 2022-132214 | A | 9/2022 |
| JP | 2022-132215 | A | 9/2022 |
| JP | 2022-132217 | A | 9/2022 |
| JP | 2022-132218 | A | 9/2022 |
| JP | 2022-132219 | A | 9/2022 |
| JP | 2022-132220 | A | 9/2022 |
| JP | 2022-132221 | A | 9/2022 |
| JP | 2022-132222 | A | 9/2022 |
| JP | 2022-132223 | A | 9/2022 |
| JP | 2022-132224 | A | 9/2022 |
| JP | 2022-132225 | A | 9/2022 |
| JP | 2022-132226 | A | 9/2022 |
| JP | 2022-132227 | A | 9/2022 |
| JP | 2022-132228 | A | 9/2022 |
| JP | 2022-132229 | A | 9/2022 |
| JP | 2022-132233 | A | 9/2022 |
| WO | 91/09912 | A1 | 7/1991 |
| WO | 97/39890 | A1 | 10/1997 |
| WO | 99/46309 | A1 | 9/1999 |
| WO | 01/18076 | A1 | 3/2001 |
| WO | 01/36504 | A1 | 5/2001 |
| WO | 03/006566 | A1 | 1/2003 |
| WO | 03/022922 | A1 | 3/2003 |
| WO | 03/048214 | A1 | 6/2003 |
| WO | 2004/052987 | A1 | 6/2004 |
| WO | 2005/052015 | A1 | 6/2005 |
| WO | 2006/123694 | A1 | 11/2006 |
| WO | 2008/047759 | A1 | 4/2008 |
| WO | 2008/047906 | A1 | 4/2008 |
| WO | 2009/044753 | A1 | 4/2009 |
| WO | 2009/102660 | A1 | 8/2009 |
| WO | 2014/007348 | A1 | 1/2014 |
| WO | 2015/104974 | A1 | 7/2015 |
| WO | 2015/119053 | A1 | 8/2015 |
| WO | 2016/130894 | A1 | 8/2016 |
| WO | 2018/008563 | A1 | 1/2018 |
| WO | 2018/181898 | A1 | 10/2018 |
| WO | 2018/216284 | A1 | 11/2018 |
| WO | 2019/008998 | A1 | 1/2019 |
| WO | 2019/159652 | A1 | 8/2019 |
| WO | 2019/187725 | A1 | 10/2019 |
| WO | 2019/225694 | A1 | 11/2019 |
| WO | 2020/129083 | A1 | 6/2020 |
| WO | 2021/039865 | A1 | 3/2021 |
| WO | 2021/054364 | A1 | 3/2021 |

OTHER PUBLICATIONS

Translation of the International Search Report issued Apr. 26, 2022 in International Application No. PCT/JP2022/008436.
Translation of the International Search Report issued Apr. 26, 2022 in International Application No. PCT/JP2022/008437.
Translation of the International Search Report issued May 17, 2022 in International Application No. PCT/JP2022/008438.
Translation of the International Search Report issued May 17, 2022 in International Application No. PCT/JP2022/008439.
Translation of the International Search Report issued May 10, 2022 in International Application No. PCT/JP2022/008440.
Translation of the International Search Report issued May 10, 2022 in International Application No. PCT/JP2022/008441.
Translation of the International Search Report issued May 10, 2022 in International Application No. PCT/JP2022/008442.
Translation of the International Search Report issued May 10, 2022 in International Application No. PCT/JP2022/008443.
Translation of the International Search Report issued May 10, 2022 in International Application No. PCT/JP2022/008444.
Translation of the International Search Report issued May 10, 2022 in International Application No. PCT/JP2022/008445.
Translation of the International Search Report issued May 10, 2022 in International Application No. PCT/JP2022/008446.
Translation of the International Search Report issued May 10, 2022 in International Application No. PCT/JP2022/008447.
Translation of the International Search Report issued May 17, 2022 in International Application No. PCT/JP2022/008448.
Translation of the International Search Report issued May 17, 2022 in International Application No. PCT/JP2022/008449.
Translation of the International Search Report issued Apr. 12, 2022 in International Application No. PCT/JP2022/008450.
Translation of the International Search Report issued Apr. 12, 2022 in International Application No. PCT/JP2022/008451.
Translation of the International Search Report issued May 17, 2022 in International Application No. PCT/JP2022/008452.
Translation of the International Search Report issued Apr. 12, 2022 in International Application No. PCT/JP2022/008453.
Translation of the International Search Report issued May 10, 2022 in International Application No. PCT/JP2022/008454.
Translation of the International Search Report issued May 10, 2022 in International Application No. PCT/JP2022/008455.
Translation of the International Search Report issued Apr. 26, 2022 in International Application No. PCT/JP2022/008458.
Translation of the International Search Report issued Apr. 26, 2022 in International Application No. PCT/JP2022/008459.
Translation of the International Search Report issued Apr. 26, 2022 in International Application No. PCT/JP2022/008460.
Translation of the International Search Report issued Apr. 19, 2022 in International Application No. PCT/JP2022/008461.
Translation of the International Search Report issued May 10, 2022 in International Application No. PCT/JP2022/008462.
Translation of the International Search Report issued May 17, 2022 in International Application No. PCT/JP2022/008463.
Translation of the International Search Report issued May 17, 2022 in International Application No. PCT/JP2022/008466.
Translation of the International Search Report issued May 17, 2022 in International Application No. PCT/JP2022/008464.
Translation of the International Search Report issued May 17, 2022 in International Application No. PCT/JP2022/008465.
Translation of the International Search Report issued Apr. 26, 2022 in International Application No. PCT/JP2022/008467.
International Preliminary Report on Patentability, with Translation of Written Opinion issued Aug. 29, 2023 in International Application No. PCT/JP2022/008436.
International Preliminary Report on Patentability, with Translation of Written Opinion issued Aug. 29, 2023 in International Application No. PCT/JP2022/008437.
International Preliminary Report on Patentability, with Translation of Written Opinion issued Aug. 29, 2023 in International Application No. PCT/JP2022/008438.
International Preliminary Report on Patentability, with Translation of Written Opinion issued Aug. 29, 2023 in International Application No. PCT/JP2022/008439.

(56) References Cited

OTHER PUBLICATIONS

International Preliminary Report on Patentability, with Translation of Written Opinion issued Aug. 29, 2023 in International Application No. PCT/JP2022/008440.
International Preliminary Report on Patentability, with Translation of Written Opinion issued Aug. 29, 2023 in International Application No. PCT/JP2022/008441.
International Preliminary Report on Patentability, with Translation of Written Opinion issued Aug. 29, 2023 in International Application No. PCT/JP2022/008442.
International Preliminary Report on Patentability, with Translation of Written Opinion issued Aug. 29, 2023 in International Application No. PCT/JP2022/008443.
International Preliminary Report on Patentability, with Translation of Written Opinion issued Aug. 29, 2023 in International Application No. PCT/JP2022/008444.
International Preliminary Report on Patentability, with Translation of Written Opinion issued Aug. 29, 2023 in International Application No. PCT/JP2022/008445.
International Preliminary Report on Patentability, with Translation of Written Opinion issued Aug. 29, 2023 in International Application No. PCT/JP2022/008446.
International Preliminary Report on Patentability, with Translation of Written Opinion issued Aug. 29, 2023 in International Application No. PCT/JP2022/008447.
International Preliminary Report on Patentability, with Translation of Written Opinion issued Aug. 29, 2023 in International Application No. PCT/JP2022/008448.
International Preliminary Report on Patentability, with Translation of Written Opinion issued Aug. 29, 2023 in International Application No. PCT/JP2022/008449.
International Preliminary Report on Patentability, with Translation of Written Opinion issued Aug. 29, 2023 in International Application No. PCT/JP2022/008450.
International Preliminary Report on Patentability, with Translation of Written Opinion issued Aug. 29, 2023 in International Application No. PCT/JP2022/008451.
International Preliminary Report on Patentability, with Translation of Written Opinion issued Aug. 29, 2023 in International Application No. PCT/JP2022/008452.
International Preliminary Report on Patentability, with Translation of Written Opinion issued Aug. 29, 2023 in International Application No. PCT/JP2022/008453.
International Preliminary Report on Patentability, with Translation of Written Opinion issued Aug. 29, 2023 in International Application No. PCT/JP2022/008454.
International Preliminary Report on Patentability, with Translation of Written Opinion issued Aug. 29, 2023 in International Application No. PCT/JP2022/008455.
International Preliminary Report on Patentability, with Translation of Written Opinion issued Aug. 29, 2023 in International Application No. PCT/JP2022/008458.
International Preliminary Report on Patentability, with Translation of Written Opinion issued Aug. 29, 2023 in International Application No. PCT/JP2022/008459.
International Preliminary Report on Patentability, with Translation of Written Opinion issued Aug. 29, 2023 in International Application No. PCT/JP2022/008460.
International Preliminary Report on Patentability, with Translation of Written Opinion issued Aug. 29, 2023 in International Application No. PCT/JP2022/008461.
International Preliminary Report on Patentability, with Translation of Written Opinion issued Aug. 29, 2023 in International Application No. PCT/JP2022/008462.
International Preliminary Report on Patentability, with Translation of Written Opinion issued Aug. 29, 2023 in International Application No. PCT/JP2022/008463.
International Preliminary Report on Patentability, with Translation of Written Opinion issued Aug. 29, 2023 in International Application No. PCT/JP2022/008466.
International Preliminary Report on Patentability, with Translation of Written Opinion issued Aug. 29, 2023 in International Application No. PCT/JP2022/008464.
International Preliminary Report on Patentability, with Translation of Written Opinion issued Aug. 29, 2023 in International Application No. PCT/JP2022/008465.
International Preliminary Report on Patentability, with Translation of Written Opinion issued Aug. 29, 2023 in International Application No. PCT/JP2022/008467.
Translation of the International Search Report issued Jun. 20, 2023 in International Application No. PCT/JP2023/013334.
Translation of the International Search Report issued Jun. 20, 2023 in International Application No. PCT/JP2023/013335.
Translation of the International Search Report issued Jun. 20, 2023 in International Application No. PCT/JP2023/013341.
Translation of the International Search Report issued Jun. 20, 2023 in International Application No. PCT/JP2023/013342.
Translation of the International Search Report issued Jun. 6, 2023 in International Application No. PCT/JP2023/013349.
Translation of the International Search Report issued Jun. 20, 2023 in International Application No. PCT/JP2023/013343.
Translation of the International Search Report issued Jun. 6, 2023 in International Application No. PCT/JP2023/013350.
Translation of the International Search Report issued Jun. 20, 2023 in International Application No. PCT/JP2023/013344.
Translation of the International Search Report issued Jun. 20, 2023 in International Application No. PCT/JP2023/013345.
Translation of the International Search Report issued Jun. 6, 2023 in International Application No. PCT/JP2023/013346.
Translation of the International Search Report issued Jun. 6, 2023 in International Application No. PCT/JP2023/013347.
Translation of the International Search Report issued Jun. 6, 2023 in International Application No. PCT/JP2023/013348.
Translation of the International Search Report issued Jun. 20, 2023 in International Application No. PCT/JP2023/013253.
Translation of the International Search Report issued Jun. 20, 2023 in International Application No. PCT/JP2023/013251.
Translation of the International Search Report issued Jun. 20, 2023 in International Application No. PCT/JP2023/013252.
Translation of the International Search Report issued Jun. 20, 2023 in International Application No. PCT/JP2023/013254.
Translation of the International Search Report issued Jun. 13, 2023 in International Application No. PCT/JP2023/013255.
Translation of the International Search Report issued Jun. 20, 2023 in International Application No. PCT/JP2023/013281.
Translation of the International Search Report issued Jun. 20, 2023 in International Application No. PCT/JP2023/013282.
Translation of the International Search Report issued Jun. 20, 2023 in International Application No. PCT/JP2023/013283.
Translation of the International Search Report issued Aug. 15, 2023 in International Application No. PCT/JP2023/025951.
Translation of the International Search Report issued Aug. 15, 2023 in International Application No. PCT/JP2023/025948.
International Preliminary Report on Patentability, with Translation of Written Opinion issued Sep. 24, 2024 in International Application No. PCT/JP2023/013251.
International Preliminary Report on Patentability, with Translation of Written Opinion issued Sep. 24, 2024 in International Application No. PCT/JP2023/013252.
International Preliminary Report on Patentability, with Translation of Written Opinion issued Sep. 24, 2024 in International Application No. PCT/JP2023/013253.
International Preliminary Report on Patentability, with Translation of Written Opinion issued Sep. 24, 2024 in International Application No. PCT/JP2023/013254.
International Preliminary Report on Patentability, with Translation of Written Opinion issued Sep. 24, 2024 in International Application No. PCT/JP2023/013281.
International Preliminary Report on Patentability, with Translation of Written Opinion issued Sep. 24, 2024 in International Application No. PCT/JP2023/013282.

(56) References Cited

OTHER PUBLICATIONS

International Preliminary Report on Patentability, with Translation of Written Opinion issued Sep. 24, 2024 in International Application No. PCT/JP2023/013283.
International Preliminary Report on Patentability, with Translation of Written Opinion issued Sep. 24, 2024 in International Application No. PCT/JP2023/013334.
International Preliminary Report on Patentability, with Translation of Written Opinion issued Sep. 24, 2024 in International Application No. PCT/JP2023/013335.
International Preliminary Report on Patentability, with Translation of Written Opinion issued Sep. 24, 2024 in International Application No. PCT/JP2023/013341.
International Preliminary Report on Patentability, with Translation of Written Opinion issued Sep. 24, 2024 in International Application No. PCT/JP2023/013342.
International Preliminary Report on Patentability, with Translation of Written Opinion issued Sep. 24, 2024 in International Application No. PCT/JP2023/013343.
International Preliminary Report on Patentability, with Translation of Written Opinion issued Sep. 24, 2024 in International Application No. PCT/JP2023/013344.
International Preliminary Report on Patentability, with Translation of Written Opinion issued Sep. 24, 2024 in International Application No. PCT/JP2023/013345.
International Preliminary Report on Patentability, with Translation of Written Opinion issued Sep. 24, 2024 in International Application No. PCT/JP2023/013346.
International Preliminary Report on Patentability, with Translation of Written Opinion issued Sep. 24, 2024 in International Application No. PCT/JP2023/013347.
International Preliminary Report on Patentability, with Translation of Written Opinion issued Sep. 24, 2024 in International Application No. PCT/JP2023/013348.
International Preliminary Report on Patentability, with Translation of Written Opinion issued Sep. 24, 2024 in International Application No. PCT/JP2023/013349.
International Preliminary Report on Patentability, with Translation of Written Opinion issued Sep. 24, 2024 in International Application No. PCT/JP2023/013350.
Anonymous: "TeflonTM FEP 100 Molding and Extrusion Resin", Jan. 1, 2015, pp. 1-2.
Anonymous: "TeflonTM FEP 9302 Molding and Extrusion Resin", Jan. 1, 2015, pp. 1-2.
Extended European Search Report and Search Opinion received for European Application No. 22759854.7, mailed on Feb. 10, 2025, 6 pages.
Extended European Search Report and Search Opinion received for European Application No. 22759855.4, mailed on Jan. 23, 2025, 6 pages.
Extended European Search Report and Search Opinion received for European Application No. 22759856.2, mailed on Jan. 30, 2025, 9 pages.
Extended European Search Report and Search Opinion received for European Application No. 22759857.0, mailed on Jan. 30, 2025, 10 pages.
Extended European Search Report and Search Opinion received for European Application No. 22759858.8, mailed on Jan. 30, 2025, 10 pages.
Extended European Search Report and Search Opinion received for European Application No. 22759859.6, mailed on Feb. 10, 2025, 6 pages.
Extended European Search Report and Search Opinion received for European Application No. 22759861.2, mailed on Feb. 10, 2025, 6 pages.
Extended European Search Report and Search Opinion received for European Application No. 22759862.0, mailed on Feb. 10, 2025, 6 pages.
Extended European Search Report and Search Opinion received for European Application No. 22759865.3, mailed on Jan. 30, 2025, 5 pages.
Extended European Search Report and Search Opinion received for European Application No. 22759866.1, mailed on Feb. 10, 2025, 5 pages.
Extended European Search Report and Search Opinion received for European Application No. 22759867.9, mailed on Jan. 16, 2025, 8 pages.
Extended European Search Report and Search Opinion received for European Application No. 22759868.7, mailed on Jan. 20, 2025, 8 pages.
Extended European Search Report and Search Opinion received for European Application No. 22759869.5, mailed on Jan. 20, 2025, 8 pages.
Extended European Search Report and Search Opinion received for European Application No. 22759870.3, mailed on Jan. 28, 2025, 6 pages.
Extended European Search Report and Search Opinion received for European Application No. 22759872.9, mailed on Feb. 10, 2025, 7 pages.
Extended European Search Report and Search Opinion received for European Application No. 22759873.7, mailed on Feb. 10, 2025, 6 pages.
Extended European Search Report and Search Opinion received for European Application No. 22759874.5, mailed on Feb. 10, 2025, 8 pages.
Extended European Search Report and Search Opinion received for European Application No. 22759876.0, mailed on Jan. 30, 2025, 8 pages.
Extended European Search Report and Search Opinion received for European Application No. 22759877.8, mailed on Jan. 30, 2025, 7 pages.
Extended European Search Report and Search Opinion received for European Application No. 22759878.6, mailed on Feb. 10, 2025, 6 pages.
International Preliminary Report on Patentability received for PCT Patent Application No. PCT/JP2023/025948, mailed on Dec. 18, 2024, 4 pages.
International Preliminary Report on Patentability received for PCT Patent Application No. PCT/JP2023/025951, mailed on Dec. 18, 2024, 5 pages.
Extended European Search Report dated Feb. 16, 2026 in application No. 23 780 910.8.
Extended European Search Report dated Feb. 23, 2026 in application No. 23 780 961.1.
Extended European Search Report dated Mar. 11, 2026 in application No. 23 780 927.2.
Extended European Search Report dated Mar. 11, 2026 in application No. 23 780 956.1.
Extended European Search Report dated Mar. 11, 2026 in application No. 23 780 962.9.
Extended European Search Report dated Mar. 11, 2026 in application No. 23 780 963.7.
Extended European Search Report dated Mar. 11, 2026 in application No. 23 780 970.2.
Extended European Search Report dated Mar. 11, 2026 in application No. 23 780 964.5.
Extended European Search Report dated Mar. 11, 2026 in application No. 23 780 968.6.
Extended European Search Report dated Mar. 11, 2026 in application No. 23 780 908.2.
Extended European Search Report dated Mar. 11, 2026 in application No. 23 780 926.4.
Extended European Search Report dated Mar. 11, 2026 in application No. 23 780 957.9.
Extended European Search Report dated Mar. 16, 2026 in application No. 23 780 965.2.
Extended European Search Report dated Jun. 8, 2026 in application No. 23839691.5.

FLUORINE-CONTAINING COPOLYMER

CROSS-REFERENCE TO RELATED APPLICATIONS

This application is a Rule 53(b) Continuation of International Application No. PCT/JP2023/013343 filed Mar. 30, 2023, which claims priorities based on Japanese Patent Application No. 2022-055229 filed Mar. 30, 2022, and Japanese Patent Application No. 2022-135145 filed Aug. 26, 2022, the respective disclosures of which are incorporated herein by reference in their entirety.

TECHNICAL FIELD

The present disclosure relates to a fluorine-containing copolymer.

BACKGROUND ART

Patent Literature 1 describes a modified fluorine-containing copolymer obtained by irradiating a copolymer containing tetrafluoroethylene unit, hexafluoropropylene unit and a perfluoro(alkyl vinyl ether) unit with radiation at an irradiation temperature equal to or lower than the melting point of the copolymer and equal to or higher than the glass transition temperature.

RELATED ART

Patent Literature

Patent Literature 1: Japanese Patent Laid-Open No. 2014-28952

SUMMARY

According to the present disclosure, there is provided a fluorine-containing copolymer comprising tetrafluoroethylene unit, hexafluoropropylene unit and perfluoro(propyl vinyl ether) unit, wherein the copolymer has a content of hexafluoropropylene unit of 9.5 to 11.4% by mass with respect to the whole of the monomer units, a content of perfluoro(propyl vinyl ether) unit of 0.8 to 1.7% by mass with respect to the whole of the monomer units, a melt flow rate at 372° C. of 9.0 to 14.0 g/10 min, and the total number of a carbonyl group-containing terminal group, —CF=$CF_2$ and —$CH_2$OH per $10^6$ main-chain carbon atoms of 100 or less.

Effects

According to the present disclosure, there is provided a fluorine-containing copolymer which can give a beautiful injection molded article by molding at a high injection speed by an injection molding method, and can give a formed article excellent in the 130° C. abrasion resistance, the methane low permeation, the 90° C. high-temperature rigidity, the 145° C. tensile creep resistance, the creep resistance, the durability to repeated loads, the solvent crack resistance and the ductility to tensile force applied at 100° C.

DESCRIPTION OF EMBODIMENTS

Hereinafter, specific embodiments of the present disclosure will be described in detail, but the present disclosure is not limited to the following embodiments.

A fluorine-containing copolymer of the present disclosure comprises tetrafluoroethylene (TFE) unit, hexafluoropropylene (HFP) unit and perfluoro(propyl vinyl ether) (PPVE) unit.

Patent Literature 1 describes that, when a small formed article or a formed article having a complicated shape is obtained by using the fluorine-containing copolymer, a material having excellent formability and good flowability is required, but a fluorine-containing copolymer excellent in the flowability is, since having a relatively low molecular weight, poor in the crack resistance. Then, Patent Literature 1 proposes obtaining a modified fluorine-containing copolymer excellent in the crack resistance by irradiating a copolymer containing tetrafluoroethylene unit, hexafluoropropylene unit and a perfluoro(alkyl vinyl ether) unit with radiation at an irradiation temperature in a specific range.

However, to reduce the cost, there is required a technique excellent in the formability for improving properties required for formed articles such as piping members, valves, members to be compressed, and joints, without irradiation with radiation. As a result of the examination of the present inventors, it has become clear that the conventional copolymer such as one described in Patent Literature 1 (the copolymer before irradiation with radiation) is difficult to improve the 90° C. high-temperature rigidity, the 145° C. tensile creep resistance, the creep resistance, and the durability to repeated loads while maintaining the injection moldability, the abrasion resistance, the methane low permeation, the solvent crack resistance, and the ductility to tensile force applied at 100° C.

Then, the present inventors have made intensive studies on the technique for simultaneously improving these properties, and have found that by regulating the contents of HFP unit and PPVE unit and the melt flow rate of the fluorine-containing copolymer containing TFE unit, HFP unit and PPVE unit in very limited ranges, the injection moldability of the fluorine-containing copolymer is improved, and further, the 130° C. abrasion resistance, the methane low permeation, the 90° C. high-temperature rigidity, the 145° C. tensile creep resistance, the creep resistance, the durability to repeated loads, the solvent crack resistance, and the ductility to tensile force applied at 100° C. of formed articles obtained from the fluorine-containing copolymer are improved.

The fluorine-containing copolymer of the present disclosure is a melt-fabricable fluororesin. Being melt-fabricable means that a polymer can be melted and processed by using a conventional processing device such as an extruder or an injection molding machine.

The content of HFP unit of the fluorine-containing copolymer is, with respect to the whole of the monomer units, 9.5 to 11.4% % by mass, preferably 9.6% by mass or higher, more preferably 9.7% by mass or higher, still more preferably 9.8% by mass or higher, further still more preferably 9.9% by mass or higher, further still more preferably 10.1% by mass or higher, especially preferably 10.2% by mass or higher and most preferably 10.4% by mass or higher, and preferably 11.3% by mass or lower, more preferably 11.2% by mass or lower, still more preferably 11.1% by mass or lower, further still more preferably 11.0% by mass or lower, further still more preferably 10.9% by mass or lower, especially preferably 10.7% by mass or lower and most preferably 10.6% by mass or lower. When the content of HFP unit is too low, formed articles excellent in the 130° C. abrasion resistance, the solvent crack resistance, and the ductility to tensile force applied at 100° C. cannot be obtained. When HFP unit is too high, formed articles excellent in the 90° C. high-temperature rigidity, the 145° C. tensile creep resistance, the creep resistance, and the durability to repeated loads cannot be obtained.

The content of PPVE unit of the fluorine-containing copolymer is, with respect to the whole of the monomer units, 0.8 to 1.7% by mass, and preferably 1.6% by mass or lower, more preferably 1.5% by mass or lower and still more preferably 1.4% by mass or lower. When the content of PPVE unit is too low, formed articles excellent in the 130° C. abrasion resistance, the solvent crack resistance, and the ductility to tensile force applied at 100° C. cannot be obtained. When PPVE unit is too high, formed articles excellent in the methane low permeation, the 90° C. high-temperature rigidity, the 145° C. tensile creep resistance, and the creep resistance cannot be obtained.

The content of TFE unit of the fluorine-containing copolymer is, with respect to the whole of the monomer units, preferably 86.9% by mass or higher, more preferably 87.0% by mass or higher, still more preferably 87.2% by mass or higher, further still more preferably 87.4% by mass or higher, especially preferably 87.6% by mass or higher and most preferably 87.7% by mass or higher, and preferably 89.7% by mass or lower, more preferably 89.6% by mass or lower, still more preferably 89.5% by mass or lower, further still more preferably 89.4% by mass or lower, especially preferably 89.3% by mass or lower and most preferably 88.8% by mass or lower. The content of TFE unit of the fluorine-containing copolymer may be 87.8% by mass or higher, and may be 88.0% by mass or higher. Then, the content of TFE unit may be selected so that the total of contents of HFP unit, PPVE unit, TFE unit and other monomer units becomes 100% by mass.

The fluorine-containing copolymer of the present disclosure is not limited as long as the copolymer contains the above three monomer units, and may be a copolymer containing only the above three monomer units, or may be a copolymer containing the above three monomer units and other monomer units.

The other monomers are not limited as long as being copolymerizable with TFE, HFP and PPVE, and may be fluoromonomers or fluorine-non-containing monomers.

It is preferable that the fluoromonomer is at least one selected from the group consisting of chlorotrifluoroethylene, vinyl fluoride, vinylidene fluoride, trifluoroethylene, hexafluoroisobutylene, monomers represented by $CH_2{=}CZ^1(CF_2)_nZ^2$ (wherein $Z^1$ is H or F, $Z^2$ is H, F or Cl, and n is an integer of 1 to 10), perfluoro(alkyl vinyl ether)s [PAVE] represented by $CF_2{=}CF{-}ORf^1$ (wherein $Rf^1$ is a perfluoroalkyl group having 1 to 8 carbon atoms) (here, excluding PPVE), alkyl perfluorovinyl ether derivatives represented by $CF_2{=}CFO{-}CH_2{-}Rf^2$ (wherein $Rf^2$ is a perfluoroalkyl group having 1 to 5 carbon atoms), perfluoro-2,2-dimethyl-1,3-dioxol [PDD], and perfluoro-2-methylene-4-methyl-1,3-dioxolane [PMD].

The monomers represented by $CH_2{=}CZ^1(CF_2)_nZ^2$ include $CH_2{=}CFCF_3$, $CH_2{=}CH{-}C_4F_9$, $CH_2{=}CH{-}C_6F_{13}$, and $CH_2{=}CF{-}C_3F_6H$.

The perfluoro(alkyl vinyl ether)s represented by $CF_2{=}CF{-}ORf^1$ include $CF_2{=}CF{-}OCF_3$ and $CF_2{=}CF{-}OCF_2CF_3$.

The fluorine-non-containing monomers include hydrocarbon-based monomers copolymerizable with TFE, HFP and PPVE. Examples of the hydrocarbon-based monomers include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, n-vinyl butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-non-containing monomers may also be functional group-containing hydrocarbon-based monomers copolymerizable with TFE, HFP and PPVE. Examples of the functional group-containing hydrocarbon-based monomers include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-non-containing monomers having a glycidyl group, such as glycidyl vinyl ether and glycidyl allyl ether; fluorine-non-containing monomers having an amino group, such as aminoalkyl vinyl ethers and aminoalkyl allyl ethers; fluorine-non-containing monomers having an amido group, such as (meth)acrylamide and methylolacrylamide; bromine-containing olefins, iodine-containing olefins, bromine-containing vinyl ethers, and iodine-containing vinyl ethers; and fluorine-non-containing monomers having a nitrile group.

The content of the other monomer units in the fluorine-containing copolymer of the present disclosure is, with respect to the whole of the monomer units, preferably 0 to 2.8% by mass, and more preferably 1.9% by mass or lower, still more preferably 0.5% by mass or lower and especially preferably 0.1% by mass or lower.

The melt flow rate (MFR) of the fluorine-containing copolymer is 9.0 to 14.0 g/10 min, preferably 9.1 g/10 min or higher, still more preferably 9.2 g/10 min or higher, further still more preferably 9.3 g/10 min or higher, further still more preferably 9.4 g/10 min or higher, especially preferably 9.5 g/10 min or higher and most preferably 10.1 g/10 min or higher, and preferably 13.5 g/10 min or lower, more preferably 13.2 g/10 min or lower, still more preferably 13.0 g/10 min or lower, further still more preferably 12.9 g/10 min or lower, further still more preferably 12.8 g/10 min or lower, especially preferably 11.8 g/10 min or lower and most preferably 10.9 g/10 min or lower. When MFR is too low, formed articles excellent in the methane low permeation and the 90° C. high-temperature rigidity cannot be obtained and beautiful injection molded articles by molding at a high injection speed by an injection molding method cannot be obtained. When MFR is too high, formed articles excellent in the 130° C. abrasion resistance, the durability to repeated loads, the 145° C. tensile creep resistance, and the solvent crack resistance cannot be obtained.

In the present disclosure, the MFR is a value obtained as a mass (g/10 min) of a polymer flowing out from a die of 2 mm in inner diameter and 8 mm in length per 10 min at 372° C. under a load of 5 kg using a melt indexer G-01 (manufactured by Toyo Seiki Seisaku-sho Ltd.), according to ASTM D1238.

The MFR can be regulated by regulating the kind and amount of a polymerization initiator to be used in polymerization of monomers, the kind and amount of a chain transfer agent, and the like.

The fluorine-containing copolymer of the present disclosure may or may not have a carbonyl group-containing terminal group, —CF═$CF_2$ or —$CH_2OH$. The fluorine-containing copolymer of the present disclosure has a total number of the carbonyl group-containing terminal group, —CF═$CF_2$ and —$CH_2OH$ of 100 or less per $10^6$ main-chain carbon atoms. The total number of the carbonyl group-containing terminal group, —CF═$CF_2$ and —$CH_2OH$ is, in the ascending order of preference, 90 or less, 80 or less, 70 or less, 60 or less, 50 or less and 40 or less. By making the total number of the carbonyl group-containing terminal group, —CF═$CF_2$ and —$CH_2OH$ in the above range, formed articles excellent in the methane low permeation can be obtained. The total number of the carbonyl group-containing terminal group, —CF═$CF_2$ and —$CH_2OH$ can be regulated, for example, by suitable selection of the kind of a polymerization initiator or a chain transfer agent, or by a wet heat treatment or fluorination treatment of the fluorine-containing copolymer described later.

The carbonyl group-containing terminal groups are for example, —COF, —COOH, —COOR (R is an alkyl group), —$CONH_2$, and —O(C═O)O—R (R is an alkyl group). The kinds of the alkyl groups (R) —COOR and —O(C═O)O—R have are determined depending on a polymerization initiator or a chain transfer agent used in production of the fluorine-containing copolymer, and are, for example, alkyl groups having 1 to 6 carbon atoms, such as —$CH_3$.

The fluorine-containing copolymer of the present disclosure may or may not have —$CF_2H$. It is preferable that the fluorine-containing copolymer of the present disclosure has —$CF_2H$, because in the case of melt forming the fluorine-containing copolymer, it becomes difficult for forming defects such as foaming to be caused, and the heat resistance of the fluorine-containing copolymer becomes excellent. The number of —$CF_2H$ of the fluorine-containing copolymer, per $10^6$ main-chain carbon atoms, may be 50 or more, and is preferably 60 or more, more preferably more than 90, still more preferably more than 120, further still more preferably more than 150, especially preferably 200 or more and most preferably 250 or more. The upper limit of the number of —$CF_2H$ is not limited, and may be, for example, 800. The number of —$CF_2H$ can be regulated, for example, by suitable selection of the kind of a polymerization initiator or a chain transfer agent, or by a wet heat treatment or fluorination treatment of the fluorine-containing copolymer described later.

For identification of the kind of the functional groups and measurement of the number of the functional groups, infrared spectroscopy can be used.

The number of the functional groups is measured, specifically, by the following method. First, the fluorine-containing copolymer is molded by cold press to prepare a film of 0.25 to 0.30 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per 1×$10^6$ carbon atoms in the fluorine-containing copolymer is calculated according to the following formula (A).

$$N = I \times K / t \quad \text{(A)}$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —CF═$CF_2$ | 1795 | 635 | 366 | $CF_2$═$CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of the functional group —COF is the total of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The number of —$CF_2H$ groups can also be determined from a peak integrated value of the —$CF_2H$ group acquired in a $^{19}$F-NMR measurement using a nuclear magnetic resonance spectrometer and set at a measurement temperature of (the melting point of a polymer+20° C.)

Functional groups such as a —$CF_2H$ group are functional groups present on the main chain terminals or side chain terminals of the fluorine-containing copolymer, and functional groups present on the main chain or the side chains thereof. These functional groups are introduced to the fluorine-containing copolymer, for example, by a chain transfer agent or a polymerization initiator used in production of the fluorine-containing copolymer. For example, in the case of using an alcohol as the chain transfer agent, or a peroxide having a structure of —$CH_2OH$ as the polymerization initiator, —$CH_2OH$ is introduced on the main chain terminals of the fluorine-containing copolymer. Alternatively, the functional group is introduced on the side chain terminal of the fluorine-containing copolymer by polymerizing a monomer having the functional group.

By carrying out a treatment such as a wet heat treatment or a fluorination treatment on the fluorine-containing copolymer having such functional groups, there can be obtained the fluorine-containing copolymer having the number of functional groups in the above range. The fluorine-containing copolymer is more preferably one having been subjected to a wet heat treatment.

The melting point of the fluorine-containing copolymer is preferably 220 to 290° C. and more preferably 240 to 280° C. Due to that the melting point is in the above range, the fluorine-containing copolymer can give a formed article better in the 130° C. abrasion resistance, the methane low permeation, the 90° C. high-temperature rigidity, the 145° C. tensile creep resistance, the creep resistance, the durability to repeated loads, the solvent crack resistance, and the ductility to tensile force applied at 100° C.

In the present disclosure, the melting point can be measured by using a differential scanning calorimeter [DSC].

The methane permeability coefficient of the fluorine-containing copolymer is preferably 7.0 $cm^3 \cdot mm/(m^2 \cdot h \cdot atm)$ or lower. The fluorine-containing copolymer of the present disclosure has an excellent methane low permeation due to suitably regulated contents of HFP unit and PPVE unit, melt flow rate (MFR), and number of functional groups.

In the present disclosure, the methane permeability coefficient can be measured under the condition of a test temperature of 60° C. and a test humidity of 0% RH. The specific measurement of the methane permeability coefficient can be carried out by a method described in Examples.

The fluorine-containing copolymer of the present disclosure can be produced by any polymerization method of bulk polymerization, suspension polymerization, solution polymerization, emulsion polymerization and the like. In these polymerization methods, conditions such as temperature and pressure, a polymerization initiator, a chain transfer agent, a solvent and other additives can suitably be set depending on the composition and the amount of a desired fluorine-containing copolymer.

The polymerization initiator may be an oil-soluble radical polymerization initiator or a water-soluble radical initiator.

An oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate;
- peroxyesters such as t-butyl peroxyisobutyrate and t-butyl peroxypivalate;
- dialkyl peroxides such as di-t-butyl peroxide; and di[fluoro(or fluorochloro)acyl] peroxides.

The di[fluoro(or fluorochloro)acyl] peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl]peroxides include di(ω-hydroperfluorohexanoyl) peroxide, di(ω-hydro-dodecafluoroheptanoyl) peroxide, di(ω-hydro-tetradecafluorooctanoyl) peroxide, di(ω-hydro-hexadecafluorononanoyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a well known water-soluble peroxide, and examples thereof include ammonium salts, potassium salts and sodium salts of persulfuric acid, perboric acid, perchloric acid, perphosphoric acid, percarbonic acid and the like, and t-butyl permaleate and t-butyl hydroperoxide. A reductant such as a sulfite salt may be combined with a peroxide and used, and the amount thereof to be used may be 0.1 to 20 times with respect to the peroxide.

Use of an oil-soluble radical polymerization initiator as the polymerization initiator is preferable, because of enabling avoidance of the formation of —COF and —COOH, and enabling easy regulation of the total number of —COF and —COOH of the fluorine-containing copolymer in the above-mentioned range. Further, use of the oil-soluble radical polymerization initiator is likely to make it easy also for the carbonyl group-containing terminal group and $—CH_2OH$ to be regulated in the above-mentioned range. It is especially suitable that the fluorine-containing copolymer is produced by suspension polymerization using the oil-soluble radical polymerization initiator. The oil-soluble radical polymerization initiator is preferably at least one selected from the group consisting of dialkyl peroxycarbonates and di[fluoro(or fluorochloro)acyl]peroxides, and more preferably at least one selected from the group consisting of di-n-propyl peroxydicarbonate, diisopropyl peroxydicarbonate, and di(ω-hydro-dodecafluoroheptanoyl) peroxide.

Examples of the chain transfer agent include hydrocarbons such as ethane, isopentane, n-hexane and cyclohexane; aromatics such as toluene and xylene; ketones such as acetone; acetates such as ethyl acetate and butyl acetate; alcohols such as methanol, ethanol and 2,2,2-trifluoroethanol; mercaptans such as methyl mercaptan; halogenated hydrocarbons such as carbon tetrachloride, chloroform, methylene chloride and methyl chloride; and 3-fluorobenzotrifluoride. The amount thereof to be added can vary depending on the magnitude of the chain transfer constant of a compound to be used, but the chain transfer agent is used usually in the range of 0.01 to 20 parts by mass with respect to 100 parts by mass of a solvent.

For example, in the cases of using a dialkyl peroxycarbonate, a di[fluoro(or fluorochloro)acyl] peroxide or the like as a polymerization initiator, although there are some cases where the molecular weight of an obtained fluorine-containing copolymer becomes too high and the regulation of the melt flow rate to a desired one is not easy, the molecular weight can be regulated by using the chain transfer agent. It is especially suitable that the fluorine-containing copolymer is produced by suspension polymerization using the chain transfer agent such as an alcohol and the oil-soluble radical polymerization initiator.

The solvent includes water and mixed solvents of water and an alcohol. A monomer to be used for the polymerization of the fluorine-containing copolymer of the present disclosure can also be used as the solvent.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2C_1CF_2CFHCl$; chlorofluoroalaknes such as $CF_2ClCFClCF_2CF_3$ and $CF_3CFClCFClCF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100 parts by mass with respect to 100 parts by mass of the solvent.

The polymerization temperature is not limited, and may be 0 to 100° C. In the case where the decomposition rate of the polymerization initiator is too high, including cases of using a dialkyl peroxycarbonate, a di[fluoro(or fluorochloro) acyl]peroxide or the like as the polymerization initiator, it is preferable to adopt a relatively low polymerization temperature such as in the temperature range of 0 to 35° C.

The polymerization pressure can suitably be determined according to other polymerization conditions such as the kind of the solvent to be used, the amount of the solvent, the vapor pressure and the polymerization temperature, but usually may be 0 to 9.8 MPaG. The polymerization pressure is preferably 0.1 to 5 MPaG, more preferably 0.5 to 2 MPaG and still more preferably 0.5 to 1.5 MPaG. When the polymerization pressure is 1.5 MPaG or higher, the production efficiency can be improved.

Examples of the additives in the polymerization include suspension stabilizers. The suspension stabilizers are not limited as long as being conventionally well-known ones, and methylcellulose, polyvinyl alcohols and the like can be used. With the use of a suspension stabilizer, suspended particles produced by the polymerization reaction are dispersed stably in an aqueous medium, and therefore the suspended particles hardly adhere on the reaction vessel even when a SUS-made reaction vessel not having been subjected to adhesion preventing treatment such as glass lining is used. Accordingly, a reaction vessel withstanding a high pressure can be used, and therefore the polymerization under a high pressure becomes possible and the production efficiency can be improved. By contrast, in the case of carrying out the polymerization without using the suspension stabilizer, the suspended particles may adhere and the production efficiency may be lowered with the use of a SUS-made reaction vessel not having been subjected to adhesion preventing treatment is used. The concentration of the suspension stabilizer in the aqueous medium can suitably be regulated depending on conditions.

In the case of obtaining an aqueous dispersion containing a fluoropolymer by a polymerization reaction, a dried fluoropolymer may be recovered by coagulating, cleaning and drying the fluorine-containing copolymer contained in the aqueous dispersion. Alternatively, in the case of obtaining the fluorine-containing copolymer as a slurry by a polymerization reaction, a dried fluoropolymer may be recovered by taking out the slurry from a reaction vessel, and cleaning and drying the slurry. The fluorine-containing copolymer can be recovered in a powder form by the drying.

The fluorine-containing copolymer obtained by the polymerization may be formed into pellets. A method of forming into pellets is not limited, and a conventionally known method can be used. Examples thereof include methods of melt extruding the fluorine-containing copolymer by using a single-screw extruder, a twin-screw extruder or a tandem extruder and cutting the resultant into a predetermined length to form the fluorine-containing copolymer into pellets. The extrusion temperature in the melt extrusion needs to be varied depending on the melt viscosity and the production method of the fluorine-containing copolymer, and is preferably the melting point of the fluorine-containing copolymer+20° C. to the melting point of the fluorine-containing copolymer+140° C. A method of cutting the fluorine-containing copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

The fluorine-containing copolymer obtained by the polymerization may be heated in the presence of air and water at a temperature of 100° C. or higher (wet heat treatment). Examples of the wet heat treatment include a method in which by using an extruder, the fluorine-containing copolymer obtained by the polymerization is melted and extruded while air and water are fed. The wet heat treatment can convert thermally unstable functional groups of the fluorine-containing copolymer, such as —COF and —COOH, to thermally relatively stable —$CF_2H$, whereby the total number of —COF and —COOH and the total number of carbonyl group-containing terminal groups and —$CH_2OH$ of the fluorine-containing copolymer can easily be regulated in the above-mentioned ranges. By heating the fluorine-containing copolymer, in addition to air and water, in the presence of an alkali metal salt, the conversion reaction to —$CF_2H$ can be promoted. Depending on applications of the fluorine-containing copolymer, however, it should be paid regard to that contamination by the alkali metal salt must be avoided.

The fluorine-containing copolymer obtained by the polymerization may be subjected to a fluorination treatment, or may not be subjected to a fluorination treatment. From the viewpoint of avoiding temporal and economic burdens, it is preferable that the fluorine-containing copolymer is not subjected to a fluorination treatment. The fluorination treatment can be carried out by bringing the fluorine-containing copolymer subjected to no fluorination treatment into contact with a fluorine-containing compound. The fluorination treatment can convert thermally unstable functional groups of the fluorine-containing copolymer, such as the carbonyl group-containing terminal groups and —$CH_2OH$, and thermally relatively stable functional groups thereof, such as —$CF_2H$, to thermally very stable —$CF_3$. Resultantly, the total number of the carbonyl group-containing terminal groups and —$CH_2OH$ of the fluorine-containing copolymer can easily be regulated in the above-mentioned range.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the fluorine-containing copolymer in a melted state may be brought into contact with the fluorine-containing compound, but the fluorination treatment can be carried out usually at a temperature of not higher than the melting point of the fluorine-containing copolymer, preferably at 20 to 220° C. and more preferably at 100 to 200° C. The fluorination treatment is carried out usually for 1 to 30 hours and preferably 5 to 25 hours. The fluorination treatment is preferred which brings the fluorine-containing copolymer having been subjected to no fluorination treatment into contact with fluorine gas ($F_2$ gas).

A composition may be obtained by mixing the fluorine-containing copolymer of the present disclosure and as required, other components. The other components include fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

Then, the other components may be other polymers other than the above-mentioned fluorine-containing copolymer. The other polymers include fluororesins other than the above fluorine-containing copolymer, fluoroelastomers and non-fluorinated polymers.

A method of producing the above composition includes a method in which the fluorine-containing copolymer and other components are dry mixed, and a method in which the fluorine-containing copolymer and other components are previously mixed by a mixer, and then, melt kneaded by a kneader, a melt extruder or the like.

The fluorine-containing copolymer of the present disclosure or the above-mentioned composition can be used as a processing aid, a forming material or the like, but it is suitable to use that as a forming material. Then, aqueous dispersions, solutions and suspensions of the fluorine-containing copolymer of the present disclosure, and the copolymer/solvent-based materials can also be utilized; and these can be used for application of coating materials, encapsulation, impregnation, and casting of films. However, since the fluorine-containing copolymer of the present disclosure has the above-mentioned properties, it is preferable to use the copolymer as the forming material.

Formed articles may be obtained by forming the fluorine-containing copolymer of the present disclosure or the above-mentioned composition.

A method of forming the fluorine-containing copolymer or the composition is not limited, and includes injection molding, extrusion forming, compression molding, blow molding, transfer molding, rotomolding and rotolining molding. As the forming method, among these, preferable are extrusion forming, compression molding, injection molding and transfer molding; from the viewpoint of being able to produce forming articles in a high productivity, more preferable are injection molding, extrusion forming and transfer molding, and still more preferable is injection molding. That is, it is preferable that formed articles are extrusion formed articles, compression molded articles, injection molded articles or transfer molded articles; and from the viewpoint of being able to produce molded articles in a high productivity, being injection molded articles, extrusion formed articles or transfer molded articles is more preferable, and being injection molded articles is still more preferable. By molding the fluorine-containing copolymer of the present disclosure by an injection molding method, beautiful formed articles can be obtained.

Formed articles containing the fluorine-containing copolymer of the present disclosure may be, for example, nuts, bolts, joints, films, bottles, gaskets, electric wire coatings, tubes, hoses, pipes, valves, sheets, seals, packings, tanks, rollers, containers, cocks, connectors, filter housings, filter cages, flowmeters, pumps, wafer carriers, and wafer boxes.

The fluorine-containing copolymer of the present disclosure, the above composition and the above formed articles can be used, for example, in the following applications.

Food packaging films, and members for liquid transfer for food production apparatuses, such as lining materials of fluid transfer lines, packings, sealing materials and sheets, used in food production processes;

chemical stoppers and packaging films for chemicals, and members for chemical solution transfer, such as lining materials of liquid transfer lines, packings, sealing materials and sheets, used in chemical production processes; inner surface lining materials of chemical solution tanks and piping of chemical plants and semiconductor factories; members for fuel transfer, such as O (square) rings, tubes, packings, valve stem materials, hoses and sealing materials, used in fuel systems and peripheral equipment of automobiles, and such as hoses and sealing materials, used in ATs of automobiles;

members used in engines and peripheral equipment of automobiles, such as flange gaskets of carburetors, shaft seals, valve stem seals, sealing materials and hoses, and other vehicular members such as brake hoses, hoses for air conditioners, hoses for radiators, and electric wire coating materials;

members for chemical transfer for semiconductor production apparatuses, such as O (square) rings, tubes, packings, valve stem materials, hoses, sealing materials, rolls, gaskets, diaphragms and joints;

members for coating and inks, such as coating rolls, hoses and tubes, for coating facilities, and containers for inks; members for food and beverage transfer, such as tubes, hoses, belts, packings and joints for food and beverage, food packaging materials, and members for glass cooking appliances; members for waste liquid transport, such as tubes and hoses for waste transport;

members for high-temperature liquid transport, such as tubes and hoses for high-temperature liquid transport;

members for steam piping, such as tubes and hoses for steam piping;

corrosionproof tapes for piping, such as tapes wound on piping of decks and the like of ships;

various coating materials, such as electric wire coating materials, optical fiber coating materials, and transparent front side coating materials installed on the light incident side and back side lining materials of photoelectromotive elements of solar cells;

diaphragms and sliding members such as various types of packings of diaphragm pumps;

films for agriculture, and weathering covers for various kinds of roof materials, sidewalls and the like;

interior materials used in the building field, and coating materials for glasses such as non-flammable fireproof safety glasses; and lining materials for laminate steel sheets used in the household electric field.

The fuel transfer members used in fuel systems of automobiles further include fuel hoses, filler hoses and evap hoses. The above fuel transfer members can also be used as fuel transfer members for gasoline additive-containing fuels, resultant to sour gasoline, resultant to alcohols, and resultant to methyl tertiary butyl ether and amines and the like.

The above chemical stoppers and packaging films for chemicals have excellent chemical resistance to acids and the like. The above chemical solution transfer members also include corrosionproof tapes wound on chemical plant pipes.

The above formed articles also include vehicular radiator tanks, chemical solution tanks, bellows, spacers, rollers and gasoline tanks, waste solution transport containers, high-temperature liquid transport containers and fishery and fish farming tanks.

The above formed articles further include members used for vehicular bumpers, door trims and instrument panels, food processing apparatuses, cooking devices, water- and oil-repellent glasses, illumination-related apparatuses, display boards and housings of OA devices, electrically illuminated billboards, displays, liquid crystal displays, cell phones, printed circuit boards, electric and electronic components, sundry goods, dust bins, bathtubs, unit baths, ventilating fans, illumination frames and the like.

Since formed articles containing the fluorine-containing copolymer of the present disclosure are excellent in the 130° C. abrasion resistance, the methane low permeation, the 90° C. high-temperature rigidity, the 145° C. tensile creep resistance, the creep resistance, the durability to repeated loads, the solvent crack resistance, and the ductility to tensile force applied at 100° C., the formed articles can suitably be utilized for piping members, valves, members to be compressed, joints, electric wire coatings and the like.

The formed articles containing the fluorine-containing copolymer of the present disclosure can suitably be utilized as members to be compressed such as gaskets and packings. The members to be compressed of the present disclosure may be gaskets or packings.

The size and shape of the members to be compressed of the present disclosure may suitably be set according to applications, and are not limited. The shape of the members to be compressed of the present disclosure may be, for example, annular. The members to be compressed of the present disclosure may also have, in plan view, a circular shape, an elliptic shape, a corner-rounded square or the like, and may be a shape having a throughhole in the central portion thereof.

It is preferable that the members to be compressed of the present disclosure are used as members constituting non-aqueous electrolyte batteries. The members to be compressed of the present disclosure are especially suitable as members to be used in the state of contacting with non-aqueous electrolytes in non-aqueous electrolyte batteries. That is, the members to be compressed of the present disclosure may also be ones having a liquid-contact surface with a non-aqueous electrolyte in the non-aqueous electrolyte batteries.

The non-aqueous electrolyte batteries are not limited as long as being batteries having a non-aqueous electrolyte, and examples thereof include lithium ion secondary batteries and lithium ion capacitors. Members constituting the non-aqueous electrolyte batteries include sealing members and insulating members.

For the non-aqueous electrolyte, one or two or more of well-known solvents can be used such as propylene carbonate, ethylene carbonate, butylene carbonate, γ-butyllactone, 1,2-dimethoxyethane, 1,2-diethoxyethane, dimethyl carbonate, diethyl carbonate and ethyl methyl carbonate. The non-aqueous electrolyte batteries may further have an electrolyte. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

The members to be compressed of the present disclosure can suitably be utilized, for example, as sealing members such as sealing gaskets and sealing packings, and insulating members such as insulating gaskets and insulating packings. The sealing members are members to be used for preventing leakage of a liquid or a gas, or penetration of a liquid or a gas from the outside. The insulating members are members to be used for insulating electricity. The members to be compressed of the present disclosure may also be members to be used for the purpose of both of sealing and insulation.

The members to be compressed of the present disclosure can suitably be used as sealing members for non-aqueous electrolyte solution batteries and insulating members for non-aqueous electrolyte solution batteries. Further, the members to be compressed of the present disclosure, due to containing the above fluorine-containing copolymer, have the excellent insulating property. Therefore, in the case of using the members to be compressed of the present disclosure as insulating members, the member firmly adheres to two or more electrically conductive members and prevents short circuit over a long term.

The fluorine-containing copolymer of the present disclosure can suitably be utilized as a material for forming electric wire coatings. Coated electric wires having a coating layer containing the fluorine-containing copolymer of the present disclosure, since exhibiting almost no fluctuation in the outer diameter, are excellent in electric properties.

The coated electric wire has a core wire, and the coating layer installed on the periphery of the core wire and containing the fluorine-containing copolymer of the present disclosure. For example, an extrusion formed article made by melt extruding the fluorine-containing copolymer in the present disclosure on a core wire can be made into the coating layer. The coated electric wires are suitable for LAN cables (Ethernet Cables), high-frequency transmission cables, flat cables and heat-resistant cables and the like, and particularly, for transmission cables such as LAN cables (Eathernet Cables) and high-frequency transmission cables.

As a material for the core wire, for example, a metal conductor material such as copper or aluminum can be used. The core wire is preferably one having a diameter of 0.02 to 3 mm. The diameter of the core wire is more preferably 0.04 mm or larger, still more preferably 0.05 mm or larger and especially preferably 0.1 mm or larger. The diameter of the core wire is more preferably 2 mm or smaller.

With regard to specific examples of the core wire, there may be used, for example, AWG (American Wire Gauge)-46 (solid copper wire of 40 μm in diameter), AWG-26 (solid copper wire of 404 μm in diameter), AWG-24 (solid copper wire of 510 μm in diameter), and AWG-22 (solid copper wire of 635 μm in diameter).

The coating layer is preferably one having a thickness of 0.1 to 3.0 mm. It is also preferable that the thickness of the coating layer is 2.0 mm or smaller.

The high-frequency transmission cables include coaxial cables. The coaxial cables generally have a structure configured by laminating an inner conductor, an insulating coating layer, an outer conductor layer and a protective coating layer in order from the core part to the peripheral part. A formed article containing the fluorine-containing copolymer of the present disclosure can suitably be utilized as the insulating coating layer containing the fluorine-containing copolymer. The thickness of each layer in the above structure is not limited, but is usually: the diameter of the inner conductor is approximately 0.1 to 3 mm; the thickness of the insulating coating layer is approximately 0.3 to 3 mm; the thickness of the outer conductor layer is approximately 0.5 to 10 mm; and the thickness of the protective coating layer is approximately 0.5 to 2 mm.

Alternatively, the coating layer may be one containing cells, and is preferably one in which cells are homogeneously distributed.

The average cell size of the cells is not limited, but is, for example, preferably 60 μm or smaller, more preferably 45 μm or smaller, still more preferably 35 μm or smaller, further still more preferably 30 μm or smaller, especially preferable 25 μm or smaller and further especially preferably 23 μm or smaller. Then, the average cell size is preferably 0.1 μm or larger and more preferably 1 μm or larger. The average cell size can be determined by taking an electron microscopic image of an electric wire cross section, calculating the diameter of each cell and averaging the diameters.

The foaming ratio of the coating layer may be 20% or higher, and is more preferably 30% or higher, still more preferably 33% or higher and further still more preferably 35% or higher. The upper limit is not limited, but is, for example, 80%. The upper limit of the foaming ratio may be 60%. The foaming ratio is a value determined as ((the specific gravity of an electric wire coating material−the specific gravity of the coating layer)/(the specific gravity of the electric wire coating material)×100. The foaming ratio can suitably be regulated according to applications, for example, by regulation of the amount of a gas, described later, to be injected in an extruder, or by selection of the kind of a gas dissolving.

Alternatively, the coated electric wire may have another layer between the core wire and the coating layer, and may further have another layer (outer layer) on the periphery of the coating layer. In the case where the coating layer contains cells, the electric wire of the present disclosure may be of a two-layer structure (skin-foam) in which a non-foaming layer is inserted between the core wire and the coating layer, a two-layer structure (foam-skin) in which a non-foaming layer is coated as the outer layer, or a three-layer structure (skin-foam-skin) in which a non-foaming layer is coated as the outer layer of the skin-foam structure. The non-foaming layer is not limited, and may be a resin layer composed of a resin, such as a TFE/HFP-based copolymer, a TFE/PAVE copolymer, a TFE/ethylene-based copolymer, a vinylidene fluoride-based polymer, a polyolefin resin such as polyethylene [PE], or polyvinyl chloride [PVC].

The coated electric wire can be produced, for example, by using an extruder, heating the fluorine-containing copolymer, extruding the fluorine-containing copolymer in a melt state on the core wire to thereby form the coating layer.

In formation of a coating layer, by heating the fluorine-containing copolymer and introducing a gas in the fluorine-containing copolymer in a melt state, the coating layer containing cells can be formed. As the gas, there can be used, for example, a gas such as chlorodifluoromethane, nitrogen or carbon dioxide, or a mixture thereof. The gas may be introduced as a pressurized gas in the heated fluorine-containing copolymer, or may be generated by mingling a chemical foaming agent in the fluorine-containing copolymer. The gas dissolves in the fluorine-containing copolymer in a melt state.

Then, the fluorine-containing copolymer of the present disclosure can suitably be utilized as a material for products for high-frequency signal transmission.

The products for high-frequency signal transmission are not limited as long as being products to be used for transmission of high-frequency signals, and include (1) formed boards such as insulating boards for high-frequency circuits, insulating materials for connection parts and printed circuit boards, (2) formed articles such as bases of high-frequency vacuum tubes and antenna covers, and (3) coated electric wires such as coaxial cables and LAN cables. The products for high-frequency signal transmission can suitably be used in devices utilizing microwaves, particularly microwaves of 3 to 30 GHz, in satellite communication devices, cell phone base stations, and the like.

In the products for high-frequency signal transmission, the fluorine-containing copolymer of the present disclosure can suitably be used as insulators in that the dielectric loss tangent is low.

As the (1) formed boards, printed wiring boards are preferable in that the good electric property is provided. The printed wiring boards are not limited, but examples thereof include printed wiring boards of electronic circuits for cell phones, various computers, communication devices and the like.

As the (2) formed articles, antenna covers are preferable in that the dielectric loss is low.

The fluorine-containing copolymer of the present disclosure can suitably be utilized for films.

The films of the present disclosure are useful as release films. The release films can be produced by forming the fluorine-containing copolymer of the present disclosure by melt extrusion, calendering, press molding, casting or the like. From the viewpoint that uniform thin films can be obtained, the release films can be produced by melt extrusion.

The films of the present disclosure can be applied to roll surfaces used in QA devices. Then, the fluorine-containing copolymer of the present disclosure is formed into needed shapes by extrusion forming, compression molding, press molding or the like to be formed into sheet-shapes, filmy shapes or tubular shapes, and can be used as surface materials for OA device rolls, OA device belts or the like. Thin-wall tubes and films can be produced particularly by a melt extrusion forming method.

The fluorine-containing copolymer of the present disclosure can suitably be utilized also for tubes, bottles and the like.

So far, embodiments have been described, but it is to be understood that various changes and modifications of patterns and details may be made without departing from the subject matter and the scope of the claims.

<1> According to a first aspect of the present disclosure, there is provided a fluorine-containing copolymer, comprising: tetrafluoroethylene unit; hexafluoropropylene unit; and perfluoro(propyl vinyl ether) unit, wherein the copolymer has: a content of hexafluoropropylene unit of 9.5 to 11.4% by mass with respect to the whole of the monomer units;

a content of perfluoro(propyl vinyl ether) unit of 0.8 to 1.7% by mass with respect to the whole of the monomer units;

a melt flow rate at 372° C. of 9.0 to 14.0 g/10 min; and a total number of a carbonyl group-containing terminal group, $—CF{=}CF_2$ and $—CH_2OH$ per $10^6$ main-chain carbon atoms of 100 or less.

<2> According to a second aspect of the present disclosure, there is provided the fluorine-containing copolymer according to claim 1, wherein the copolymer has a content of hexafluoropropylene unit of 9.9 to 10.9% by mass with respect to the whole of the monomer units.

<3> According to a third aspect of the present disclosure, there is provided the fluorine-containing copolymer according to claim 1 or 2, wherein the copolymer has a content of perfluoro(propyl vinyl ether) unit of 0.8 to 1.4% by mass with respect to the whole of the monomer units.

<4> According to a fourth aspect of the present disclosure, there is provided the fluorine-containing copolymer according to any one of claims 1 to 3, wherein the copolymer has a melt flow rate at 372° C. of 9.5 to 12.8 g/10 min.

<5> According to a fifth aspect of the present disclosure, there is provided the fluorine-containing copolymer according to any one of claims 1 to 4, wherein the copolymer has the number of —$CF_2H$ per $10^6$ main-chain carbon atoms of 50 or more.

<6> According to a sixth aspect of the present disclosure, there is provided an injection molded article comprising the fluorine-containing copolymer according to any one of claims 1 to 5.

<7> According to a seventh aspect of the present disclosure, there is provided a coated electric wire comprising a coating layer comprising the fluorine-containing copolymer according to any one of claims 1 to 5.

<8> According to an eighth aspect of the present disclosure, there is provided a formed article comprising the fluorine-containing copolymer according to any one of claims 1 to 5, wherein the formed article is a piping member, a valve, a member to be compressed, a joint or an electric wire coating.

EXAMPLES

Then, the embodiments of the present disclosure will be described by way of Examples, but the present disclosure is not any more limited only to these Examples.

Each numerical value in Examples was measured by the following methods.

(Content of Monomer Units)

The content of each monomer unit of the fluorine-containing copolymer was measured by an NMR analyzer (for example, manufactured by Bruker BioSpin GmbH, AVANCE 300, high-temperature probe), or an infrared absorption spectrometer (manufactured by PerkinElmer, Inc., Spectrum One)

(Melt Flow Rate (MFR))

The MFR of the fluorine-containing copolymer was determined by using a Melt Indexer G-01 (manufactured by Toyo Seiki Seisaku-sho, Ltd.), and making the polymer to flow out from a die of 2 mm in inner diameter and 8 mm in length at 372° C. under a load of 5 kg and measuring the mass (g/10 min) of the polymer flowing out per 10 min, according to ASTM D1238.

(The Number of —$CF_2H$)

The number of —$CF_2H$ groups of the fluorine-containing copolymer was determined from a peak integrated value of the —$CF_2H$ group acquired in a $^{19}F$-NMR measurement using a nuclear magnetic resonance spectrometer AVANCE-300 (manufactured by Bruker BioSpin GmbH) and set at a measurement temperature of (the melting point of the polymer+20° C.)

(The Numbers of —COOH, —$COOCH_3$, —$CH_2OH$, —COF, —CF═$CF_2$ and —$CONH_2$)

A dried powder or pellets obtained in each of Examples and Comparative Examples were molded by cold press to prepare a film of 0.25 to 0.3 mm in thickness. The film was 40 times scanned by a Fourier transform infrared spectrometer [FT-IR (Spectrum One, manufactured by PerkinElmer, Inc.)] and analyzed to obtain an infrared absorption spectrum. The obtained infrared absorption spectrum was compared with an infrared absorption spectrum of an already known film to determine the kinds of terminal groups. Further, from an absorption peak of a specific functional group emerging in a difference spectrum between the obtained infrared absorption spectrum and the infrared absorption spectrum of the already known film, the number N of the functional group per $1\times10^6$ carbon atoms in the sample was calculated according to the following formula (A).

$$N = I \times K/t \tag{A}$$

I: absorbance

K: correction factor t: thickness of film (mm)

Regarding the functional groups in Examples, for reference, the absorption frequency, the molar absorption coefficient and the correction factor are shown in Table 2. Then, the molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —CF═$CF_2$ | 1795 | 635 | 366 | $CF_2$═$CF_2$ |

(The Number of —OC(═O)O—R (Carbonate Groups))

Analysis of the number of —OC(═O)O—R (carbonate groups) was carried out by a method described in International Publication No. WO2019/220850. The number of —OC(═O)O—R (carbonate groups) was calculated as in the calculation method of the number of functional groups, N, except for setting the absorption frequency at 1,817 $cm^{-1}$, the molar extinction coefficient at 170 (l/cm/mol) and the correction factor at 1,426.

(Melting Point)

The fluorine-containing copolymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point of the fluorine-containing copolymer was determined from a melting curve peak observed in the second temperature raising step.

Comparative Example 1

40.25 kg of deionized water and 0.228 kg of methanol were fed in a 174 L-volume autoclave with a stirrer, and the autoclave inside was sufficiently vacuumized and replaced with nitrogen. Thereafter, the autoclave inside was vacuum deaerated, and in the autoclave put in a vacuum state, 40.25 kg of HFP and 0.31 kg of PPVE were fed; and the autoclave was heated to 32.0° C. Then, TFE was fed until the internal pressure of the autoclave became 0.923 MPa; and then, 0.31 kg of an 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.923 MPa, and by continuously adding TFE, the set pressure was made to be held. After 1.5 hours from the polymerization initiation, 0.228 kg of methanol was additionally fed. After 2 hours and after 4 hours from the polymerization initiation, 0.31 kg of DHP was additionally fed, and the internal pressure was lowered by 0.001 MPa, respectively; after 6 hours therefrom, 0.24 kg thereof was fed and the internal pressure was lowered by 0.001 MPa. Hereafter, 0.07 kg of DHP was fed at every 2 hours until the reaction finished.

Then, at each time point when the amount of TFE continuously additionally fed reached 8.1 kg, 16.2 kg and 24.3 kg, 0.11 kg of PPVE was additionally fed. Then, at each time point when the amount of TFE additionally fed reached 6.0 kg and 18.1 kg, 0.228 kg of methanol was additionally fed in the autoclave. Then, when the amount of TFE additionally fed reached 40.25 kg, the polymerization was made to finish. After the finish of the polymerization, unreacted TFE and HFP were discharged to thereby obtain a wet powder. Then, the wet powder was washed with pure water, and thereafter dried at 150° C. for 10 hours to thereby obtain 47.3 kg of a dry powder.

The obtained powder was melt extruded at 370° C. by a screw extruder (trade name: PCM46, manufactured by Ikegai Corp.) to thereby obtain pellets of a copolymer. By using the obtained pellets, the above physical properties were measured by the methods described above. The results are shown in Table 3.

Comparative Example 2

40.25 kg of deionized water and 0.189 kg of methanol were fed in a 174 L-volume autoclave with a stirrer, and the autoclave inside was sufficiently vacuumized and replaced with nitrogen. Thereafter, the autoclave inside was vacuum deaerated, and in the autoclave put in a vacuum state, 40.25 kg of HFP and 0.48 kg of PPVE were fed; and the autoclave was heated to 30.0° C. Then, TFE was fed until the internal pressure of the autoclave became 0.911 MPa; and then, 0.63 kg of an 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.911 MPa, and by continuously adding TFE, the set pressure was made to be held. After 1.5 hours from the polymerization initiation, 0.189 kg of methanol was additionally fed. After 2 hours and 4 hours from the polymerization initiation, 0.63 kg of DHP was additionally fed, and the internal pressure was lowered by 0.001 MPa, respectively; after 6 hours therefrom, 0.48 kg thereof was fed and the internal pressure was lowered by 0.001 MPa. Hereafter, 0.13 kg of DHP was fed at every 2 hours until the reaction finished, and at every time, the internal pressure was lowered by 0.001 MPa.

Then, at each time point when the amount of TFE continuously additionally fed reached 8.1 kg, 16.2 kg and 24.3 kg, 0.14 kg of PPVE was additionally fed. Then, at each time point when the amount of TFE additionally fed reached 6.0 kg and 18.1 kg, 0.190 kg of methanol was additionally fed in the autoclave. Then, when the amount of TFE additionally fed reached 40.25 kg, the polymerization was made to finish. After the finish of the polymerization, unreacted TFE and HFP were discharged to thereby obtain a wet powder. Then, the wet powder was washed with pure water, and thereafter dried at 150° C. for 10 hours to thereby obtain 46.2 kg of a dry powder.

The obtained powder was melt extruded at 370° C. by a screw extruder (trade name: PCM46, manufactured by Ikegai Corp.) to thereby obtain pellets of a copolymer. By using the obtained pellets, the above physical properties were measured by the methods described above. The results are shown in Table 3.

Comparative Example 3

40.25 kg of deionized water and 0.324 kg of methanol were fed in a 174 L-volume autoclave with a stirrer, and the autoclave inside was sufficiently vacuumized and replaced with nitrogen. Thereafter, the autoclave inside was vacuum deaerated, and in the autoclave put in a vacuum state, 40.25 kg of HFP and 0.35 kg of PPVE were fed; and the autoclave was heated to 25.5° C. Then, TFE was fed until the internal pressure of the autoclave became 0.843 MPa; and then, 1.25 kg of an 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.843 MPa, and by continuously adding TFE, the set pressure was made to be held. After 1.5 hours from the polymerization initiation, 0.324 kg of methanol was additionally fed. After 2 hours and after 4 hours from the polymerization initiation, 1.25 kg of DHP was additionally fed, and the internal pressure was lowered by 0.002 MPa, respectively; after 6 hours therefrom, 0.96 kg thereof was fed and the internal pressure was lowered by 0.002 MPa. Hereafter, 0.25 kg of DHP was fed at every 2 hours until the reaction finished, and the internal pressure was lowered by 0.002 MPa.

Then, at each time point when the amount of TFE continuously additionally fed reached 8.1 kg, 16.2 kg and 24.3 kg, 0.09 kg of PPVE was additionally fed. Then, at each time point when the amount of TFE additionally fed reached 6.0 kg and 18.1 kg, 0.324 kg of methanol was additionally fed in the autoclave. Then, when the amount of TFE additionally fed reached 40.25 kg, the polymerization was made to finish. After the finish of the polymerization, unreacted TFE and HFP were discharged to thereby obtain a wet powder. Then, the wet powder was washed with pure water, and thereafter dried at 150° C. for 10 hours to thereby obtain 45.1 kg of a dry powder.

The obtained powder was melt extruded at 370° C. by a screw extruder (trade name: PCM46, manufactured by Ikegai Corp.) to thereby obtain pellets of a copolymer. By using the obtained pellets, the above physical properties were measured by the methods described above. The results are shown in Table 3.

Comparative Example 4

Copolymer pellets were obtained as in Comparative Example 2, except for changing the amount of methanol fed before the polymerization initiation to 0.282 kg, changing the each amount of methanol dividedly additionally fed after the polymerization initiation to 0.282 kg, changing the amount of PPVE fed before the polymerization initiation to 0.36 kg, changing the each amount of PPVE dividedly additionally fed after the polymerization initiation to 0.11 kg, and changing the each set pressure in the autoclave inside before and after the polymerization initiation to 0.906 MPa. By using the obtained pellets, the above physical properties were measured by the methods described above. The results are shown in Table 3.

Comparative Example 5

40.25 kg of deionized water and 0.332 kg of methanol were fed in a 174 L-volume autoclave with a stirrer, and the autoclave inside was sufficiently vacuumized and replaced with nitrogen. Thereafter, the autoclave inside was vacuum deaerated, and in the autoclave put in a vacuum state, 40.25 kg of HFP was fed; and the autoclave was heated to 30.0° C. Then, TFE was fed until the internal pressure of the autoclave became 0.915 MPa; and then, 0.63 kg of an 8-mass % di(ω-hydroperfluorohexanoyl) peroxide solution (hereinafter, abbreviated to DHP) was fed in the autoclave to initiate polymerization. The internal pressure of the autoclave at the initiation of the polymerization was set at 0.915 MPa, and by continuously adding TFE, the set pressure was made to be held. After 1.5 hours from the polymerization initiation, 0.332 kg of methanol was additionally fed. After 2 hours and 4 hours from the polymerization initiation, 0.63 kg of DHP was additionally fed, and the internal pressure was lowered by 0.001 MPa, respectively; after 6 hours therefrom, 0.48 kg thereof was fed and the internal pressure was lowered by 0.001 MPa. Hereafter, 0.13 kg of DHP was fed at every 2 hours until the reaction finished, and at every time, the internal pressure was lowered by 0.001 MPa.

Then, at each time point when the amount of TFE additionally fed reached 6.0 kg and 18.1 kg, 0.332 kg of methanol was additionally fed in the autoclave. Then, when the amount of TFE additionally fed reached 40.25 kg, the polymerization was made to finish. After the finish of the polymerization, unreacted TFE and HFP were discharged to thereby obtain a wet powder. Then, the wet powder was washed with pure water, and thereafter dried at 150° C. for 10 hours to thereby obtain 45.5 kg of a dry powder.

The obtained powder was melt extruded at 370° C. by a screw extruder (trade name: PCM46, manufactured by Ikegai Corp.) to thereby obtain pellets of a copolymer. By using the obtained pellets, the HFP content and the PPVE content were measured by the methods described above. The results are shown in Table 3.

Comparative Example 6

1.65 kg of deionized water was fed in a 6 L-volume autoclave with a stirrer, and the autoclave inside was sufficiently vacuumized and replaced with nitrogen. Thereafter, the autoclave inside was vacuum deaerated, and in the autoclave put in a vacuum state, 1.65 kg of HFP and 16.4 g of PPVE were fed; and the autoclave was heated to 40.0° C. Then, a mixed gas of TFE and HFP in a 91:9 molar ratio was fed until the internal pressure of the autoclave became 1.310 MPa; and then, 10.0 g of a 40-mass % diisopropyl peroxydicarbonate solution was fed in the autoclave to initiate polymerization. The internal pressure of the autoclave at the initiation of the polymerization was set at 1.310 MPa, and by continuously adding the mixed gas of TFE and HFP in a 91:9 molar ratio, the set pressure was made to be held.

Then, at each time point when the amount of the additional gas continuously additionally fed reached 132 g and 264 g, 1.5 g of PPVE was additionally fed. Then, when the amount of the additional gas fed reached 343 g, the polymerization was made to finish. After the finish of the polymerization, unreacted TFE and HFP were discharged to thereby obtain a wet powder. Then, the wet powder was washed with pure water, and thereafter dried at 110° C. for 10 hours and at 140° C. for 5 hours by a hot-air dryer, and then vacuum dried at 140° C. for 24 hours by a vacuum dryer to thereby obtain 302 g of a dry powder.

Example 1

Copolymer pellets were obtained as in Comparative Example 2, except for changing the amount of methanol fed before the polymerization initiation to 0.301 kg, changing the each amount of methanol dividedly additionally fed after the polymerization initiation to 0.301 kg, changing the amount of PPVE fed before the polymerization initiation to 0.56 kg, changing the each amount of PPVE dividedly additionally fed after the polymerization initiation to 0.15 kg, and changing the each set pressure in the autoclave inside before and after the polymerization initiation to 0.930 MPa. By using the obtained pellets, the above physical properties were measured by the methods described above. The results are shown in Table 3.

Example 2

Copolymer pellets were obtained as in Comparative Example 2, except for changing the amount of methanol fed before the polymerization initiation to 0.271 kg, changing the each amount of methanol dividedly additionally fed after the polymerization initiation to 0.271 kg, changing the amount of PPVE fed before the polymerization initiation to 0.47 kg, changing the each amount of PPVE dividedly additionally fed after the polymerization initiation to 0.13 kg, and changing the each set pressure in the autoclave inside before and after the polymerization initiation to 0.923 MPa. By using the obtained pellets, the above physical properties were measured by the methods described above. The results are shown in Table 3.

Example 3

Copolymer pellets were obtained as in Comparative Example 2, except for changing the amount of methanol fed before the polymerization initiation to 0.253 kg, changing the each amount of methanol dividedly additionally fed after the polymerization initiation to 0.253 kg, changing the amount of PPVE fed before the polymerization initiation to 0.38 kg, changing the each amount of PPVE dividedly additionally fed after the polymerization initiation to 0.11 kg, and changing the each set pressure in the autoclave inside before and after the polymerization initiation to 0.917 MPa. By using the obtained pellets, the above physical properties were measured by the methods described above. The results are shown in Table 3.

Example 4

Copolymer pellets were obtained as in Comparative Example 2, except for changing the amount of methanol fed before the polymerization initiation to 0.231 kg, changing the each amount of methanol dividedly additionally fed after the polymerization initiation to 0.231 kg, changing the amount of PPVE fed before the polymerization initiation to 0.29 kg, changing the each amount of PPVE dividedly additionally fed after the polymerization initiation to 0.09 kg, and changing the each set pressure in the autoclave inside before and after the polymerization initiation to 0.909 MPa. By using the obtained pellets, the above physical properties were measured by the methods described above. The results are shown in Table 3.

TABLE 3

| | HFP content (% by mass) | PPVE content (% by mass) | MFR (g/10 min) | —$CF_2H$ (number/C$10^6$) | —COOH —COF —$CH_2OH$ (number/C$10^6$) | —OCOOR (number/C$10^6$) | Others (number/C$10^6$) | Melting point (° C.) |
|---|---|---|---|---|---|---|---|---|
| Comparative Example 1 | 13.0 | 1.0 | 10.0 | 359 | 27 | ND | <6 | 241 |
| Comparative Example 2 | 10.8 | 1.3 | 8.0 | 330 | 28 | ND | <6 | 252 |
| Comparative Example 3 | 9.0 | 0.8 | 10.8 | 374 | 21 | ND | <6 | 267 |
| Comparative Example 4 | 11.0 | 1.0 | 17.2 | 428 | 25 | ND | <6 | 253 |
| Comparative Example 5 | 10.6 | 0.0 | 12.6 | 400 | 15 | ND | <6 | 263 |
| Comparative Example 6 | 10.4 | 1.0 | 10.0 | 20 | 14 | 336 | <6 | 257 |
| Example 1 | 9.9 | 1.4 | 12.8 | 388 | 28 | ND | <6 | 256 |
| Example 2 | 10.2 | 1.2 | 10.9 | 370 | 26 | ND | <6 | 256 |
| Example 3 | 10.5 | 1.0 | 10.1 | 363 | 25 | ND | <6 | 256 |
| Example 4 | 10.9 | 0.8 | 9.5 | 357 | 23 | ND | <6 | 255 |

The description of "Others (number/C$10^6$)" in Table 3 denotes the total number of —$COOCH_3$, —CF═$CF_2$ and —$CONH_2$. The description of "<6" in Table 3 means that the number (total number) of the objective functional groups was less than 6. The description of "ND" in Table 3 means that for the objective functional group, no quantitatively determinable peak could be observed.

Then, by using the obtained pellets or dry powder, the following properties were evaluated. The results are shown in Table 4.

(Abrasion Test)

By using the pellets or the dry powder and a heat press molding machine, a sheet-shape test piece of approximately 0.2 mm in thickness was prepared and cut out into a test piece of 10 cm×10 cm. The prepared test piece was fixed on a test bench of a Taber abrasion tester (No. 101, Taber type abrasion tester with an option, manufactured by Yasuda Seiki Seisakusho, Ltd.), and the abrasion test was carried out under the conditions of at a test piece surface temperature of 130° C., at a load of 500 g, using an abrasion wheel CS-10 (rotationally polished in 20 rotations with an abrasion paper #240), and at a rotation rate of 60 rpm, using the Taber abrasion tester. The weight of the test piece after 1,000 rotations was measured, and the same test piece was further subjected to the test of 4,300 rotations and thereafter, the weight thereof was measured. The abrasion loss was determined by the following formula.

$$\text{Abrasion loss (mg)} = M1 - M2$$

M1: the weight of the test piece after the 1,000 rotations (mg)

M2: the weight of the test piece after the 4,300 rotations (mg)

(Methane ($CH_4$) Permeability Coefficient)

By using the pellets or the dry powder and a heat press molding machine, a sheet-shape test piece of approximately 0.1 mm in thickness was prepared. Measurement of the methane permeability was carried out on the obtained test piece according to a method described in JIS K7126-1:2006 by using a differential pressure type permeability tester (L100-5000 type gas permeability tester, manufactured by Systech illinois Ltd.). There was obtained a numerical value of the methane permeability at a permeation area of 50.24 $cm^2$, a test temperature of 60° C. and at a test humidity of 0% RH. By using the obtained methane permeability and the thickness of the test piece, the methane permeability coefficient was calculated by the following formula.

$$\text{Methane permeability coefficient}\left(\text{cm}^3\cdot\text{mm}/(\text{m}^2\cdot\text{h}\cdot\text{atm})\right) = GTR \times d/24$$

GTR: methane permeability ($cm^3/(m^2 \cdot 24\ h \cdot atm)$)

d: test piece thickness (mm)

(90° C. Load Deflection Rate)

By using the pellets or the dry powder and a heat press molding machine, a sheet-shape test piece of approximately 3.3 mm in thickness was prepared and cut out into a test piece of 80×10 mm; and the test piece was heated in an electric furnace at 100° C. for 20 hours. A test was carried out according to a method described in JIS K-K7191-1 except for using the obtained test piece, by a heat distortion tester (manufactured by Yasuda Seiki Seisakusho, Ltd.) under the conditions of at a test temperature of 30 to 150° C., at a temperature-increasing rate of 120° C./h, at a bending stress of 1.8 MPa and the flatwise method. The load deflection rate was determined by the following formula. A sheet low in the load deflection rate at 90° C. is excellent in the high-temperature rigidity.

$$\text{Load deflection rate (\%)} = a2/a1 \times 100$$

a1: a thickness of the test piece before the test (mm)

a2: an amount deflected at 90° C. (mm)

(Tensile Creep Test)

The tensile creep strain was measured by using TMA-7100, manufactured by Hitachi High-Tech Science Corp. By using the pellets or the dry powder and a heat press molding machine, a sheet of approximately 0.1 mm in thickness was prepared, and a sample of 2 mm in width and 22 mm in length was prepared from the sheet. The sample was mounted on measurement jigs with the distance between the jigs of 10 mm. A load was applied on the sample so that the cross-sectional load became 3.13 N/mm$^2$, and allowed to stand at 145° C.; and there was measured the displacement (mm) from the timepoint of 70 min from the test initiation to the timepoint of 375 min from the test initiation, and there was calculated the proportion (tensile creep strain (%)) of the displacement (mm) to the initial sample length (10 mm). A sheet low in the tensile creep stain (%) measured under the condition of at 145° C. for 375 min is hardly elongated even when a tensile load is applied for a long time in a very high-temperature environment, being excellent in the high-temperature tensile creep resistance.

(Evaluation of the Creep Resistance)

The measurement of the creep resistance was carried out according to ASTM D395 or JIS K6262:2013. By using the pellets or the dry powder and a heat press molding machine, a molded article of 13 mm in outer diameter and 8 mm in height was prepared. The obtained molded article was cut to prepare a test piece of 13 mm in outer diameter and 6 mm in height. The prepared test piece was compressed by using a compression apparatus at ordinary temperature to a compression deformation rate of 25%. The compressed test piece was allowed to stand still in an electric furnace as it was fixed on a compression apparatus, and allowed to stand at 55° C. for 72 hours. The compression apparatus was taken out from the electric furnace, and cooled to room temperature; thereafter, the test piece was dismantled. The recovered test piece was allowed to stand at room temperature for 30 min; thereafter, the height of the recovered test piece was measured, and the extent of recovery was determined by the following formula.

$$\text{Extent of recovery (\%)} = (t_2 - t_1)/t_3 \times 100$$

$t_1$: a height of a spacer (mm)

$t_2$: a height of the test piece dismantled from the compression apparatus (mm)

$t_3$: a compression deformed height (mm)

In the above test, $t_1$ was 4.5 mm and $t_3$ was 1.5 mm.

(Tensile Strength after 60,000 Cycles)

The tensile strength after 60,000 cycles was measured by using a fatigue testing machine MMT-250NV-10, manufactured by Shimadzu Corp. By using the pellets or the dry powder and a heat press molding machine, a sheet of approximately 2.4 mm in thickness was prepared, and a sample in a dumbbell shape (thickness: 2.4 mm, width: 5.0 mm, measuring section length: 22 mm) was prepared by using an ASTM D1708 microdumbbell. The sample was mounted on measuring jigs and the measuring jigs were installed in a state of the sample being mounted in a thermostatic chamber at 140° C. The tensile operation in the uniaxial direction was repeated at a stroke of 0.2 mm and at a frequency of 100 Hz, and there was measured the tensile strength at every tensile operation (tensile strength at the time the stroke was +0.2 mm, unit: N).

A sheet high in the tensile strength after 60,000 cycles retains the high tensile strength even after loading is repeated 60,000 times, being excellent in the durability (140° C.) to repeated loads.

(Chemical Agent Immersion Crack Test)

By using the pellets or the dry powder and a heat press molding machine, a molded article of approximately 2 mm in thickness was prepared. The obtained sheet was punched out by using a rectangular dumbbell of 13.5 mm×38 mm to obtain three test pieces. A notch was formed on the middle of a long side of the each obtained test piece according to ASTM D1693 by a blade of 19 mm×0.45 mm. The three notched test pieces and 25 g of a 30-weight % sodium hydroxide aqueous solution were put in a 100-mL polypropylene-made bottle, and heated in an electric furnace at 100° C. for 20 hours; thereafter, the notched test pieces were taken out. The obtained three notched test pieces were mounted on a stress crack test jig according to ASTM D1693, and heated in an electric furnace at 150° C. for 24 hours; thereafter, the notches and their vicinities were visually observed and the number of cracks was counted. A sheet having no crack generated is excellent in the solvent crack resistance.

Good: the number of cracks was 0

Poor: the number of cracks was 1 or more (Injection Moldability)

Condition

The copolymer was injection molded by using an injection molding machine (SE50EV-A, manufactured by Sumitomo Heavy Industries, Ltd.) set at a cylinder temperature of 385° C., a metal mold temperature of 182° C. and an injection speed of 20 mm/s. The metal mold used was a metal mold (100 mm×100 mm×2.0 mmt, film gate, flow length from the gate: 100 mm) Cr plated on HPM38. The obtained injection molded article was observed and evaluated according to the following criteria. The presence/absence of white turbidness was visually checked. The presence/absence of roughness of the surface was checked by touching the surface of the injection molded article.

3: The whole of the injection molded article was transparent and the whole surface was smooth.

2: White turbidness was observed within the region of 1 cm from the portion where the gate of the metal mold had been positioned, and the whole surface was smooth.

1: White turbidness was observed within the region of 1 cm from the portion where the gate of the metal mold had been positioned, and roughness was observed on the surface within the region of 1 cm from the portion where the gate of the metal mold had been positioned.

0: The copolymer was not filled in the whole of the metal mold and the molded article having a desired shape was not obtained.

(100° C. Tensile Elongation)

By using the pellets and a heat press molding machine, a test piece (compression molded) of 2.0 mm in thickness was prepared. A dumbbell shape test piece was punched out from the test piece by using an ASTM V-type dumbbell; and by using the obtained dumbbell shape test piece, the tensile elongation was measured at 100° C. by using an Autograph (AG-I, 300 kN, manufactured by Shimadzu Corp.), according to ASTM D638 under the condition of 50 mm/min.

(Forming of Electric Wire Coating)

By using a 30-mmφ electric wire coating extruder (manufactured by Tanabe Plastics Machinery Co. Ltd.), the fluorine-containing copolymer was extrusion coated in the following coating thickness on a conductor of 0.50 mm in conductor diameter to thereby obtain a coated electric wire.

The electric wire coating extrusion conditions were as follows.

It was visually confirmed that the film was prepared without any problem.

TABLE 4

| | 130° C. Abrasion loss (mg) | $CH_4$ permeability coefficient $cm^3 \cdot mm/(m^2 \cdot h \cdot atm)$ | 90° C. Load deflection rate (%) | 145° C. Tensile creep strain (%) | Evaluation of creep resistance Extent of recovery (%) | Tensile strength after 60,000 cycles (N) | Chemical agent immersion crack test | Injection moldability | 100° C. Tensile elongation (%) | Forming of electric wire coating | Forming of film |
|---|---|---|---|---|---|---|---|---|---|---|---|
| Comparative Example 1 | 27.3 | 7.1 | 99% | 7.73 | 6% | 1.97 | good | 2 | 456 | — | — |
| Comparative Example 2 | 25.9 | 7.5 | 80% | 3.19 | 11% | 2.93 | good | 0 | 396 | — | — |
| Comparative Example 3 | 33.0 | 6.9 | 52% | 1.48 | 17% | 3.42 | poor | 2 | 290 | good | good |
| Comparative Example 4 | 34.6 | 6.6 | 69% | 3.90 | 11% | 2.37 | poor | 3 | 364 | good | good |
| Comparative Example 5 | 36.3 | 6.5 | 52% | 1.81 | 14% | 2.74 | poor | 3 | 290 | — | — |
| Comparative Example 6 | 29.6 | 8.1 | 68% | 2.68 | 13% | 2.94 | good | — | — | — | — |
| Example 1 | 30.8 | 6.9 | 68% | 2.56 | 13% | 2.96 | good | 3 | 360 | good | good |
| Example 2 | 29.6 | 6.9 | 69% | 2.65 | 13% | 2.96 | good | 2 | 362 | good | good |
| Example 3 | 29.6 | 6.9 | 69% | 2.79 | 13% | 2.90 | good | 2 | 362 | good | good |
| Example 4 | 29.5 | 6.9 | 69% | 3.06 | 12% | 2.81 | good | 1 | 366 | good | good |

a) Core conductor: mild steel wire conductor diameter: 0.50 mm
b) Coating thickness: 0.20 mm
c) Coated electric wire diameter: 0.90 mm
d) Electric wire take-over speed: 30 m/min
e) Extrusion condition:

Cylinder screw diameter = 30 mm, a single−screw extruder of $L/D = 22$

Die (inner diameter)/tip (outer diameter)=9.0 mm/5.0 mm Set temperature of the extruder: barrel section C-1 (320° C.), barrel section C-2 (350° C.), barrel section C-3 (370° C.), head section H (380° C.), die section D-1 (380° C.), die section D-2 (380° C.), Set temperature for preheating core wire: 80° C.

It was visually confirmed that the coated electric wire was prepared without any problem.

(Forming of Film)

By using a ϕ14-mm extruder (manufactured by Imoto Machinery Co. Ltd.) and a T die, a film was prepared. The extrusion conditions were as follows.

a) Take-up speed: 1 m/min
b) Roll temperature: 120° C.
c) Film width: 70 mm
d) Thickness: 0.10 mm
e) Extrusion condition:

Cylinder screw diameter=14 mm, a single-screw extruder of L/D=20

Set temperature of the extruder: barrel section C-1 (330° C.), barrel section C-2 (350° C.), barrel section C-3 (365° C.), T die section (370° C.)

The invention claimed is:

1. A fluorine-containing copolymer, comprising: tetrafluoroethylene unit; hexafluoropropylene unit; and perfluoro (propyl vinyl ether) unit, wherein the copolymer has: a content of hexafluoropropylene unit of 9.5 to 11.4% by mass with respect to the whole of the monomer units;

a content of perfluoro (propyl vinyl ether) unit of −0.8 to 1.7% 0.8 to 1.6% by mass with respect to the whole of the monomer units;

a melt flow rate at 372° C. of 9.0 to 14.0 g/10 min; and a total number of a carbonyl group-containing terminal group, $-CF{=}CF_2$ and $-CH_2OH$ per $10^6$ main-chain carbon atoms of 70 or less.

2. The fluorine-containing copolymer according to claim 1, wherein the copolymer has a content of hexafluoropropylene unit of 9.9 to 10.9% by mass with respect to the whole of the monomer units.

3. The fluorine-containing copolymer according to claim 1, wherein the copolymer has a content of perfluoro (propyl vinyl ether) unit of 0.8 to 1.4% by mass with respect to the whole of the monomer units.

4. The fluorine-containing copolymer according to claim 1, wherein the copolymer has a melt flow rate at 372° C. of 9.5 to 12.8 g/10 min.

5. An injection molded article comprising the fluorine-containing copolymer according to claim 1.

6. A coated electric wire comprising a coating layer comprising the fluorine-containing copolymer according to claim 1.

7. A formed article comprising the fluorine-containing copolymer according to claim 1, wherein the formed article is a piping member, a valve, a member to be compressed, a joint, a tube, a film, or an electric wire coating.

* * * * *